United States Patent
Wu

(10) Patent No.: US 10,127,635 B2
(45) Date of Patent: Nov. 13, 2018

(54) METHOD AND DEVICE FOR IMAGE NOISE ESTIMATION AND IMAGE CAPTURE APPARATUS

(71) Applicant: Novatek Microelectronics Corp., Hsinchu (TW)

(72) Inventor: Shih-Ta Wu, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 214 days.

(21) Appl. No.: 15/224,674

(22) Filed: Aug. 1, 2016

(65) Prior Publication Data

US 2017/0345131 A1    Nov. 30, 2017

(30) Foreign Application Priority Data

May 30, 2016   (TW) .............................. 105116806 A

(51) Int. Cl.
  *G06T 5/00*   (2006.01)

(52) U.S. Cl.
  CPC .... *G06T 5/002* (2013.01); *G06T 2207/10004* (2013.01); *G06T 2207/20021* (2013.01)

(58) Field of Classification Search
  CPC .................................................. G06T 5/002
  See application file for complete search history.

(56) References Cited

U.S. PATENT DOCUMENTS

| | | | |
|---|---|---|---|
| 7,486,820 B2 * | 2/2009 | Grady ...................... | G06T 7/11 382/160 |
| 7,561,732 B1 | 7/2009 | Owechko et al. | |
| 8,885,890 B2 * | 11/2014 | Tardif .................... | G06T 5/002 382/106 |
| 8,995,784 B2 * | 3/2015 | Hasinoff ............ | H04N 5/23229 382/199 |
| 9,973,694 B1 * | 5/2018 | van Hoff ............ | H04N 5/23238 |
| 2003/0231792 A1 * | 12/2003 | Zhang ................ | G06K 9/00201 382/154 |

(Continued)

FOREIGN PATENT DOCUMENTS

TW    I528815    4/2016

OTHER PUBLICATIONS

"Office Action of Taiwan Counterpart Application," dated Apr. 25, 2017, p. 1-p. 3, in which the listed references were cited.

*Primary Examiner* — Mia M Thomas
(74) *Attorney, Agent, or Firm* — JCIPRNET

(57) ABSTRACT

A method and device for image noise estimation and image capture apparatus are provided. In the device, a global noise estimation unit is configured to determine a plurality of current sample blocks of a current image frame and a plurality of previous sample blocks of a previous image frame, and calculate a block feature of each of the current sample blocks, and calculate a block sum-of-absolute-difference (SAD) between each of the current sample blocks and corresponding one of the previous sample blocks, and cluster the current sample blocks into a plurality of segments according to the block features, and respectively establish a plurality of noise models for the segments according to the block features and the block SAD. A local noise calculation unit is configured to calculate noise level information of a local image block of the current image frame according to a corresponding noise model of the noise models.

45 Claims, 7 Drawing Sheets

(56) References Cited

U.S. PATENT DOCUMENTS

| | | | | |
|---|---|---|---|---|
| 2004/0151380 A1* | 8/2004 | Jeong | G06K 9/32 | 382/217 |
| 2004/0223640 A1* | 11/2004 | Bovyrin | G06K 9/32 | 382/154 |
| 2007/0286476 A1* | 12/2007 | Kim | G06K 9/32 | 382/154 |
| 2008/0002878 A1* | 1/2008 | Meiyappan | G06K 9/32 | 382/154 |
| 2008/0037862 A1* | 2/2008 | Jeon | G06K 9/32 | 382/154 |
| 2009/0041336 A1* | 2/2009 | Ku | G06T 7/593 | 382/154 |
| 2009/0278961 A1 | 11/2009 | Mohanty et al. | | |
| 2010/0128972 A1* | 5/2010 | Koizumi | G06T 7/593 | 382/154 |
| 2010/0220932 A1* | 9/2010 | Zhang | G06K 9/6297 | 382/209 |
| 2011/0135012 A1* | 6/2011 | Li | G06T 7/0002 | 375/240.29 |
| 2011/0188740 A1* | 8/2011 | Lim | G06K 9/00 | 382/154 |
| 2011/0285701 A1* | 11/2011 | Chen | G06K 9/4638 | 345/419 |
| 2012/0008857 A1* | 1/2012 | Choi | G06T 7/0022 | 382/154 |
| 2012/0163703 A1* | 6/2012 | Lim | G06T 5/50 | 382/154 |
| 2012/0163704 A1* | 6/2012 | Chang | G06T 7/0022 | 382/154 |
| 2012/0195493 A1* | 8/2012 | Lin | G06T 7/97 | 382/154 |
| 2012/0237114 A1* | 9/2012 | Park | G06T 7/593 | 382/154 |
| 2013/0089269 A1* | 4/2013 | Barnum | G06T 5/003 | 382/261 |
| 2013/0127995 A1* | 5/2013 | Lee | H04N 13/0025 | 348/46 |
| 2013/0129190 A1* | 5/2013 | Cohen | G06T 7/593 | 382/154 |
| 2013/0136339 A1* | 5/2013 | Moon | G06K 9/62 | 382/154 |
| 2013/0208975 A1* | 8/2013 | Hsu | G06T 7/0075 | 382/154 |
| 2013/0215234 A1* | 8/2013 | Lim | G06T 7/593 | 348/47 |
| 2013/0314409 A1* | 11/2013 | Guseva | G06T 15/00 | 345/419 |
| 2014/0015923 A1* | 1/2014 | Au | G06T 7/0002 | 348/43 |
| 2014/0193094 A1* | 7/2014 | Shin | G06T 5/002 | 382/264 |
| 2014/0219552 A1* | 8/2014 | Porikli | G06T 5/002 | 382/155 |
| 2014/0286593 A1* | 9/2014 | Numata | G06T 5/002 | 382/275 |
| 2015/0010247 A1* | 1/2015 | Tanaka | H04N 1/409 | 382/254 |
| 2015/0023611 A1* | 1/2015 | Salvador | G06T 3/4053 | 382/263 |
| 2015/0187051 A1 | 7/2015 | Wu | | |
| 2015/0281677 A1* | 10/2015 | Ha | H04N 13/026 | 348/44 |
| 2015/0371420 A1* | 12/2015 | Yerushalmy | G06T 3/4038 | 382/284 |
| 2016/0321523 A1* | 11/2016 | Sen | G06T 5/002 | |
| 2018/0027224 A1* | 1/2018 | Javidnia | H04N 13/239 | 382/154 |

* cited by examiner

METHOD AND DEVICE FOR IMAGE NOISE ESTIMATION AND IMAGE CAPTURE APPARATUS

CROSS-REFERENCE TO RELATED APPLICATION

This application claims the priority benefit of Taiwan application serial no. 105116806, filed on May 30, 2016. The entirety of the above-mentioned patent application is hereby incorporated by reference herein and made a part of this specification.

BACKGROUND OF THE INVENTION

1. Field of the Invention

The invention relates to an image processing technique, and particularly relates to a method and a device for image noise estimation and an image capture apparatus.

2. Description of Related Art

When the ambient light is insufficient, the images taken by electronic image capture apparatuses such as digital cameras and digital video recorders are usually subject to severe noise interference. In the conventional noise-canceling methods, a spatial noise filter may be used to cancel spatial noises, and a temporal noise filter may be used to cancel temporal noises. A temporal and spatial noise filter combines a spatial noise filter and a temporal noise filter, where the temporal noise filter is used for a static area in the image, and the spatial noise filter is used in a dynamic area of the image. Accordingly, an afterimage of a motion object generated when the temporal noise filter is used in the dynamic area may be avoided while the noises in the dynamic area may still be canceled. Thus, there may not be a significant difference in image quality from the static area. However, to effectively cancel noises by a noise filter, a noise level in the image must be estimated beforehand, so as to correctly identify the dynamic and static areas in the image to thereby allow the noise filter to adjust a filtering strength based on the amplitude of the noises. In the conventional noise estimation method, a noise model is usually established based on a local estimation model. Even though it is simpler to adopt a local estimation model, its requirement on a parameter storage space is higher. In addition, in the process of establishing a noise model in the conventional noise estimation method, the signal-dependent characteristics and the edge-dependent characteristics of the noises are normally not considered. Namely, the strength of the noises may vary according to the pixel Y luminance and the pixel edge strength. Therefore, how to increase the accuracy for noise estimation for images remains an important issue.

SUMMARY OF THE INVENTION

The invention provides a method and a device for image noise estimation as well as an image capture apparatus capable of improving an accuracy for image noise estimation.

An embodiment of the invention provides a method for image noise estimation. The method includes steps as follows: determining a plurality of current sample blocks in a current image frame and a plurality of previous sample blocks in a previous image frame; calculating a block feature in each of the current sample blocks, and calculating a block sum-of-absolute-difference (SAD) between each of the current sample blocks and a corresponding previous sample block of the previous sample blocks in at least one color space component; clustering the current sample blocks into a plurality of segments based on the block feature; respectively establishing a noise model for each of the segments based on the block features and the block SADs; and calculating noise level information of a local image block of the current image frame based on a corresponding noise model of the noise models.

An embodiment of the invention provides a device for image noise estimation. The device for image noise estimation includes a global noise estimation unit and a local noise calculation unit. The global noise estimation unit is configured to determine a plurality of current sample blocks in a current image frame and a plurality of previous sample blocks in a previous image frame. The global noise estimation unit is further configured to calculate a block feature of each of the current sample blocks, and calculate a block SAD between each of the current sample blocks and a corresponding previous sample block of the previous sample blocks in at least one color space component. The global noise estimation unit is further configured to cluster the current sample blocks into a plurality of segments based on the block features, and respectively establish a noise model for each of the segments based on the block features and the block SADs. The local noise calculation unit is connected to the global noise estimation unit. The local noise calculation unit is configured to calculate noise level information of a local image block of the current image frame based on a corresponding noise model of the noise models.

An embodiment of the invention provides an image capture apparatus. The image capture apparatus includes an image capturer, a memory, a processor, and a non-transitory medium. The image capturer is configured to capture a current image frame. The memory is configured to store the current image frame and a previous image frame. The non-transitory medium is configured to store a program. The processor connects the non-transitory medium, the image capturer, and the memory. The processor accesses the memory and executes the program of the non-transitory medium. The program includes a global noise estimation unit and a local noise calculation unit. The global noise estimation unit is configured to determine a plurality of current sample blocks in the current image frame and a plurality of previous sample blocks in the previous image frame. The global noise estimation unit is configured to calculate the block feature of each of the current sample blocks. The noise estimation unit is configured to calculate a block SAD between each of the current sample blocks and a corresponding previous sample block of the previous sample blocks in at least one color space component. The noise estimation unit is configured to cluster the current sample blocks into a plurality of segments based on the block features. The noise estimation unit is configured establish a noise model for each of the segments based on the block features and the block SADs, respectively. The local noise calculation unit is configured to calculate noise level information of a local image block of the current image frame based on a corresponding noise model of the noise models.

Based on the above, the method for image noise estimation, the device for image noise estimation, and the image capture apparatus according to the embodiments of the invention are able to establish the noise model by performing global noise estimation focusing on the current image frame and the previous image frame in the temporal domain and taking information such as the pixel luminance and edge strength into consideration. The noise model may be used for the local image block of the current image frame to obtain the noise level information of the local image block based on the feature of the local image block. Thus, the method for image noise estimation, the device for image noise estimation, and the image capture apparatus according to the embodiments of the invention are able to improve the general accuracy of image noise estimation.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
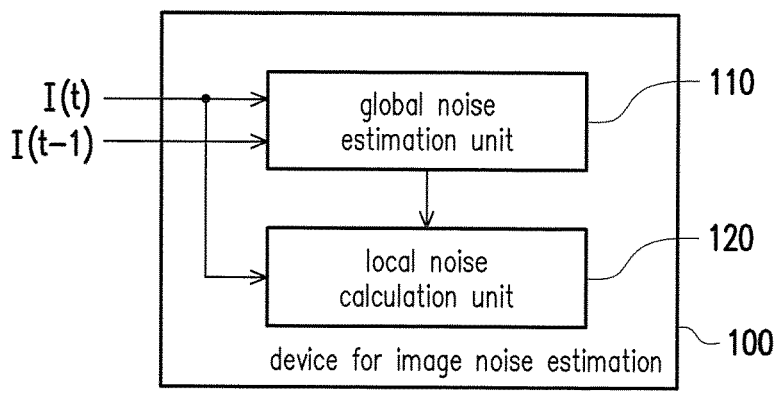
FIG. 1 is a schematic circuit block view illustrating a device for image noise estimation according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Throughout the specification (including claims), the term "couple" (or "connect") may refer to any direct or indirect connection means. For example, if it is described that a first device is coupled (or connected) to a second device, it should be interpreted that the first device may be directly connected to the second device, or the first device may be indirectly connected to the second device through another device or by a connection means. Moreover, whenever possible, elements/components/steps with same reference numerals represent same or similar parts in the drawings and embodiments. Descriptions related to elements/components/steps referred to with same reference numerals or described with same terms in different embodiments may be referred to each other.

FIG. 1 is a schematic circuit block view illustrating a device 100 for image noise estimation according to an embodiment of the invention. Referring to FIG. 1, in this embodiment, the device 100 for image noise estimation may be disposed in an electronic apparatus having an image capture function. Here, the electronic apparatus may be a digital camera, a digital video recorder, a smart phone, a personal digital assistant (PDA), a tablet computer, a notebook computer, a smart glass, a smart watch, or other fixed or portable apparatuses, for example. In addition, the image capturing function may be performed by a camera or a video recorder, for example, and may include an optical fixed-focus lens or an optical variable-focus lens and be carried out as an image sensing device such as a charge coupled device (CCD) or a complementary metal-oxide semiconductor (CMOS) device. However, it should be noted herein that the invention is not limited thereto.

In this embodiment, the device 100 for image noise estimation is configured to estimate and calculate noises of an image captured by the electronic apparatus. The device for image noise estimation 100 may be a central processing unit (CPU), a programmable general-purpose or specific-purpose microprocessor, a digital signal processor (DSP), a programmable controller, an application specific integrated circuit ASIC), a programmable logic device (PLD), any other similar devices or a combination thereof. Thus, the device 100 for image noise estimation may carry out respective functions of the device 100 by means of software or firmware, by means of hardware (circuit), or by means of combination of software and hardware. In some other embodiments, the device 100 for image noise estimation may be a system circuit including a plurality of integrated circuits and system circuits of other components.

The device 100 for image noise estimation includes a global noise estimation unit 110 and a local noise calculation unit 120. In an example where the device 100 for image noise estimation is implemented by means of hardware, the global noise estimation unit 110 may be a global noise estimation circuit, and the local noise calculation unit 120 may be a local noise calculation circuit. The global noise estimation unit 110 receives a current image frame I(t) and a previous image frame I(t−1). The global noise estimation unit 110 serves to analyze the current image frame I(t) and the previous image frame I(t−1) to establish noise models. The local noise calculation unit 120 is connected to the global noise estimation unit 110. Based on the noise models established by the global noise estimation unit 110, the local noise calculation unit 120 may perform feature capturing to a local image block in the current image frame I(t) and use a noise model parameter together to obtain noise level information of the local image block. In other words, the device 100 for image noise estimation is a temporal noise estimation device. The image noise estimation device 100 establishes the noise models by analyzing two image frames that are adjacent in time of analysis.

Figure 2:
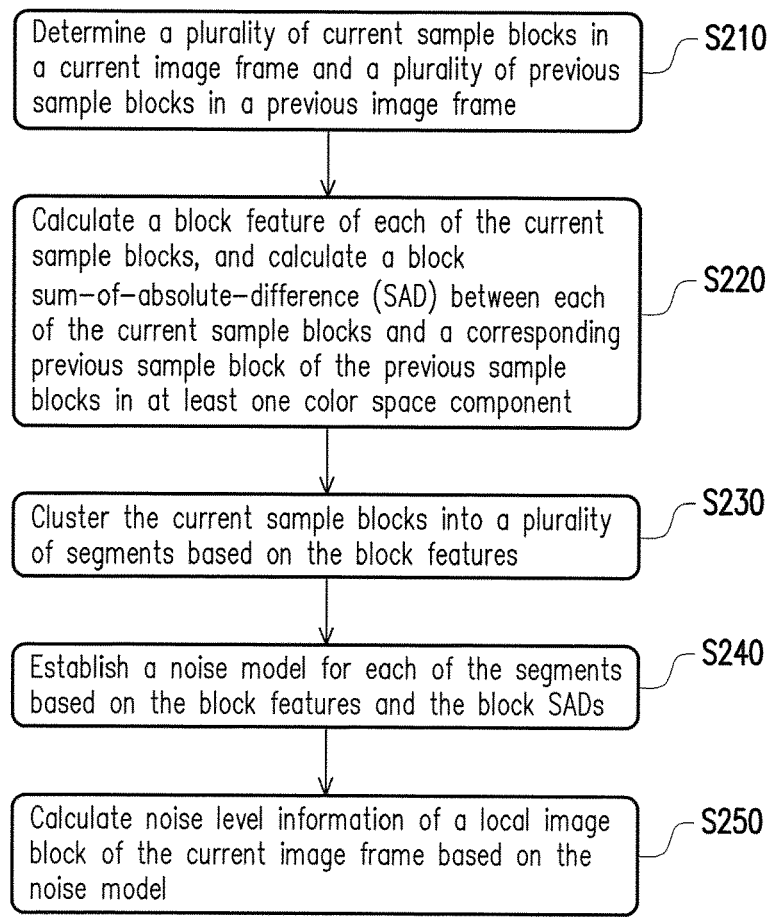
FIG. 2 is a flowchart illustrating a method for image noise estimation according to an embodiment of the invention.

FIG. 2 is a flowchart illustrating a method for image noise estimation according to an embodiment of the invention. Referring to FIGS. 1 and 2, the global noise estimation unit 110 determines a plurality of current sample blocks in the current image frame I(t) and a plurality of previous sample blocks in the previous image frame I(t−1). In some embodiments, the global noise estimation unit 110 may calculate a sample step value sampleStep based on a sample number sampleNum at Step S210, so as to determine a sample position of the current sample block in the current image frame I(t), as well as determining a sample position of the previous sample block in the previous image frame I(t−1). The sample number sampleNum represents the number of blocks to be sampled in an image frame. The sample number sampleNum may be determined based on design or application requirements. For example, the global noise estimation unit 110 may determine the sample step value based on Equation (1) below.

$$sampleStep = \max\left(\text{round}\left(\frac{blkNum}{sampleNum}\right), 1\right) \quad (1)$$

Figure 3:
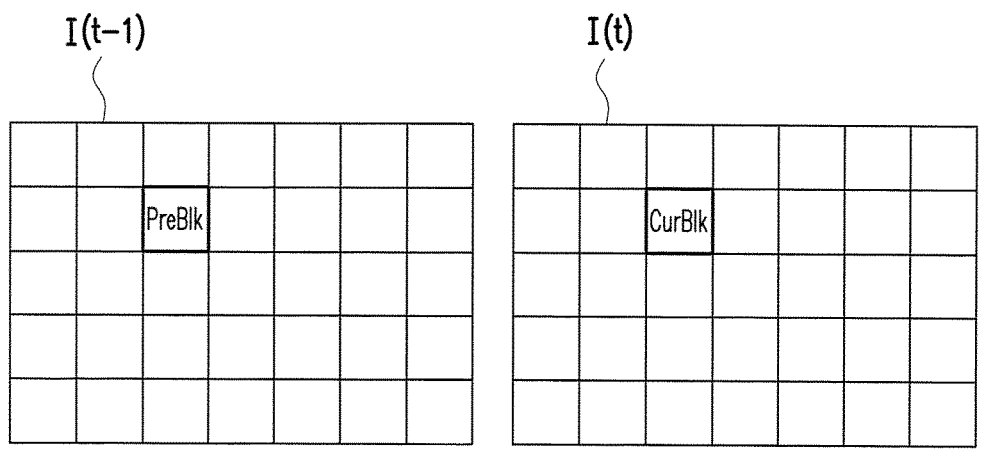
FIG. 3 is a schematic view illustrating sampling of sample blocks according to an embodiment of the invention.

In Equation (1), blkNum represents the total block number in an image frame, round( ) is a rounding function, and max( ) is a function of obtaining a maximum value. The sample step value sampleStep is determined by rounding a value obtained after clustering the total block number blkNum of the image frame by the sample number sampleNum. In addition, the sample step value sampleStep is not less than 1. For example, FIG. 3 is a schematic view illustrating sampling of sample blocks according to an embodiment of the invention. The global noise estimation unit 110 samples the current image frame I(t) and the previous image frame I(t−1) by moving at least one block. Here, the sample number sampleNum may be set based on the needs of use. At Step 210, the global noise estimation unit 110 may determine a sample position of a current sample block CurBlk in the current image frame I(t), namely determining a sample position of a previous sample block PreBlk in the previous image frame I(t−1), based on the sample step value sampleStep. The position of each current sample block CurBlk in the current image frame I(t) is the same as the sample position of each previous sample block PreBlk in the previous image frame I(t−1). For example, assuming that the total block number blkNum is 35, if the sample number sampleNum is set as 17, the sample step value sampleStep is 2. The sample step value sampleStep being 2 means that the global noise estimation unit 110 samples the current image frame I(t) in a manner of sampling one block per movement of two blocks. The sampling manner for the previous image frame I(t−1) is the same as the sampling manner of the current image frame I(t).

At Step S220, the global noise estimation unit 110 calculates a block feature of each current sample block, and calculates a sum-of-absolute-difference (SAD) of the block between each current sample block and the corresponding previous sample block in at least one color space component. Based on the design requirements, the device 100 for image noise estimation may be used in various kinds of color spaces. For example, in this embodiment, the device 100 for image noise estimation may be used in a YUV color space, wherein a color space component Y is a luminance component, and color space components U and V are chrominance components. However, the use of the invention is not limited thereto. In another embodiment, the device 100 for image noise estimation may be used in an RGB color space or other color spaces.

Taking the YUV color space as an example, the global noise estimation unit 110 may calculate a luminance average value of a plurality of pixels of each current sample block in the luminance component Y as block feature. In this embodiment, the global noise estimation unit 110 may calculate a luminance average value blkMean_Y in each current sample block based on Equations (2) and (3) in the following. One current sample block curBlk has a plurality of pixels, and curBlk_Y(m,n) represents a luminance value of a pixel at a position (m,n) in the current sample block curBlk. In this embodiment, the luminance average value blkMean_Y is a result of a sum of the luminance values curBlk_Y(m,n) of all the pixels in the current sample block curBlk clustered by a block area blkVol. In addition, the block area blkVol is a result of multiplying a height blkSize of the current sample block curBlk with a width blkSize of the current sample block curBlk.

$$blkMean\_Y = \frac{1}{blkVol} \sum_{m,n=0}^{blkSize-1} curBlk\_Y(m, n) \quad (2)$$

$$blkVol = blkSize * blkSize \quad (3)$$

The global noise estimation unit 110 may further calculate a block sum-of-absolute-difference (SAD) blkSAD_Y between each current sample block and the corresponding sample block in the luminance component Y, and calculate block SADs blkSAD_U and blkSAD_V between each current sample block and the corresponding sample block in the chrominance components U and V. In the following, the block SAD blkSAD_Y is described in detail as an example. However, it should be noted that calculation of the block SADs blkSAD_U and blkSAD_V may be inferred by referring to the descriptions about the block SAD blkSAD_Y.

For example, the global noise estimation unit 110 may calculate the block SAD blkSAD_Y between the current sample block and the corresponding previous sample block in the luminance component Y based on Equation (4) in the following. The global noise estimation unit 110 may calculate an absolute difference between the luminance value curBlk_Y(m,n) of the pixel at the position (m,n) in the current sample block curBLK and the luminance value preBlk_Y(m,n) of the pixel at the position (m,n) in the previous sample block preBLK. The global noise estimation unit 110 may add up the absolute differences of all the pixels between the current sample block curBlk and the previous sample block preBlk as the block SAD blkSAD_Y of the current sample block curBlk.

$$blkSAD\_Y = \sum_{m,n=0}^{blkSize-1} |curBlk\_Y(m, n) - preBlk\_Y(m, n)| \quad (4)$$

In this embodiment, the global noise estimation unit 110 may further calculate a pixel edge strength value of each pixel in each current sample block and calculates a block edge strength value of each current sample block based on the pixel edge strength values of the pixels at Step S220. For example, the global noise estimation unit 110 may determine the block edge strength value of each current sample block based on Equations (5), (6), and (7) in the following. However, it should be understood that the invention is not limited thereto.

$$\text{blkEdgVar\_Y} = \sum_{m,n=0}^{blkSize-1} \text{pixelEdgVar\_Y}(m, n) \quad (5)$$

$$\text{pixelEdgVar\_Y} = |C - LP| + \sum_{t=0}^{7} |P_t - LP| \quad (6)$$

$$LP = \frac{C*4(P_0 + P_1 + P_2 + P_3)*2 + (P_4 + P_5 + P_6 + P_7)}{16} \quad (7)$$

Figure 4:
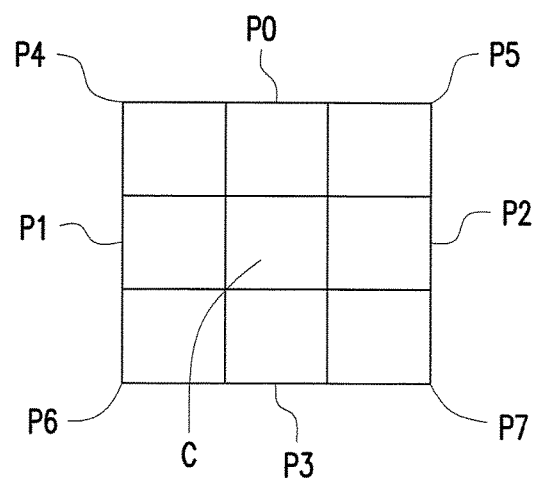
FIG. 4 is a schematic view illustrating a current pixel and a plurality of adjacent pixels thereof in a sample block according to an embodiment of the invention.

FIG. 4 is a schematic view illustrating a current pixel and a plurality of adjacent pixels thereof in a sample block according to an embodiment of the invention. For example, it is assumed that the current sample block curBlk has a plurality of pixels, such as pixels C, P0, P1, P2, P3, P4, P5, P6, and P7 in FIG. 4. For the current pixel C of the pixels of the current sample block curBlk, the global noise estimation unit 110 may calculate a weighted average value LP of the current pixel C and the adjacent pixels P0 to P7. For example, the global noise estimation unit 110 may calculate the weighted average LP of the current pixel C based on Equation (7). In Equation (7), C represents a luminance value of the current pixel C, $P_0$ represents a luminance value of the adjacent pixel P0, $P_1$ represents a luminance value of the adjacent pixel P1, $P_2$ represents a luminance value of the adjacent pixel P2, $P_3$ represents a luminance value of the adjacent pixel P3, $P_4$ represents a luminance value of the adjacent pixel P4, $P_5$ represents a luminance value of the adjacent pixel P5, $P_6$ represents a luminance value of the adjacent pixel P6, and $P_7$ represents a luminance value of the adjacent pixel P7. Weighting in Equation (7) may be changed based on design or application requirements.

The global noise estimation unit 110 may calculate a first absolute difference |C−LP| between the current pixel C and the weighted average value LP, respectively calculate a plurality of second absolute differences |$P_0$−LP|, |$P_1$−LP|, |$P_2$−LP|, |$P_3$−LP|, |$P_4$−LP|, |$P_5$−LP|, |$P_6$−LP|, and |P−LP| between the adjacent pixels $P_0$ to $P_7$ and the weighted average value LP, and calculate a sum of the first absolute value and the second absolute values as a pixel edge strength value pixelEdgVar_Y of the current pixel C. For example, the global noise estimation unit 110 may further use Equation (6) to calculate the pixel edge strength value pixelEdgVar_Y of the current pixel C. Accordingly, the global noise estimation unit 110 may use Equation (6) and Equation (7) to obtain the pixel edge strength values pixelEdgVar_Y of all the pixels of the current sample block curBlk.

In one current sample block curBlk, the global noise estimation unit 110 may calculate a sum of the pixel edge strength values pixelEdgVar_Y of the pixels as a block edge strength value blkEdgVar_Y of the current sample block curBlk. For example, the global noise estimation unit 110 may further use Equation (5) to calculate the block edge strength value blkEdgVar_Y of the current sample block curBlk. Here, pixelEdgVar_Y(m,n) represents the pixel edge strength value pixelEdgVar_Y of the pixel at the position (m, n) in the current sample block curBlk. The block edge strength value blkEdgVar_Y is a result of a sum of the pixel edge strength values pixelEdgVar_Y of all the pixels of the sample block curBlk.

Figure 5:
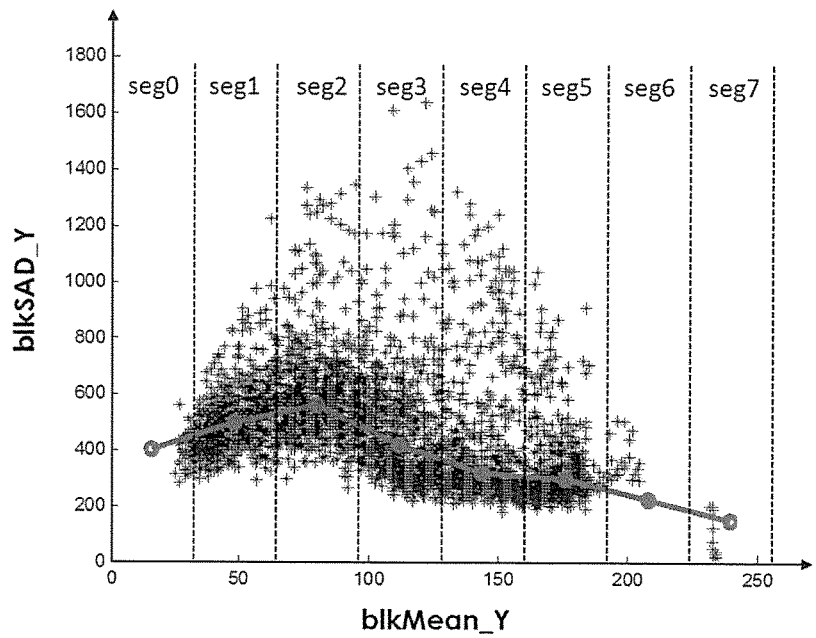
FIG. 5 is a schematic view illustrating clustering the sample blocks into a plurality of segments according to an embodiment of the invention.

Referring to FIG. 2, at Step S230, the global noise estimation unit 110 may cluster the current sample blocks determined at Step S210 into a plurality of segments based on the block luminance average value blkMean_Y of each current sample block. The number of the segments may be determined based on design requirements. For example (but not limited thereto), FIG. 5 is a schematic view illustrating clustering the sample blocks into a plurality of segments according to an embodiment of the invention. A horizontal axis of FIG. 5 represents the luminance average value blkMean_Y of the current sample block, while a vertical axis of FIG. 5 represents the block SAD blkSAD_Y of the current sample block. A mark "+" shown in FIG. 5 indicates the position of one current sample block in a coordinate system formed by the block luminance average value blkMean_Y and the block SAD blkSAD_Y. Since different luminances usually have different noise level information, the global noise estimation unit 110 may cluster the current sample blocks into a plurality of segments seg0, seg1, seg2, seg3, seg4, seg5, seg6, and seg7 based on the block luminance average value blkMean_Y of each current sample block obtained at Step S220.

For example, the global noise estimation unit 110 may filter each current sample block based on Equation (8) in the following. However, it should be understood that the invention is not limited thereto. In this embodiment, the global noise estimation unit 110 may filter the current sample blocks based on the block luminance average value blkMean_Y and the block edge strength value blkEdgVar_Y of each current sample block at Step 230, so as to obtain a plurality of filtered current sample blocks. The luminance average values blkMean_Y of the filtered current sample blocks are in a range of a predetermined minimum luminance average threshold NE_blkMeanY_minTh to a predetermined maximum luminance average threshold NE_blkMeanY_maxTh, and the block edge strength values blkEdgVar_Y of the filtered current sample blocks are smaller than a predetermined edge strength threshold NE_blkEdgVar_maxTh. In other words, the global noise estimation unit 110 may filter out blocks that are too dark or too bright in the luminance component and blocks whose edge strengths are too strong in the current sample blocks. The blocks that are too dark or too bright are blocks reaching luminance saturation and may have a noise value that is too low and affects estimation. The blocks whose edge strengths are too strong may have drastic luminance variation and the luminance average values of these blocks may be less representative, so these blocks may be classified into an unsuitable segment and affect the estimation. Based on the luminance average values blkMean_Y of the filtered current sample blocks, the global noise estimation unit 110 may cluster the filtered current sample blocks into the segments seg0 to seg7 at Step S230.

$$(\text{blkMean\_}Y > NE\_\text{blkMean}Y\_\min Th) \cap$$

$$(\text{blkMean\_}Y < NE\_\text{blkMean}Y\_\max Th) \cap$$

$$(\text{blkEdgVar\_}Y < NE\_\text{blkEdgVar\_}\max Th) \quad (8)$$

At Step S240, the global noise estimation unit 110 may establish a noise model for each of the segments seg0 to seg7 based on the block feature and the block SAD of each current sample block, respectively. For example, the global noise estimation unit 110 may respectively calculate a noise average value noiseSAD_Mean and a noise standard deviation SAD_STD of a first segment of the segments in the color space component (e.g., the luminance component Y) as the corresponding noise model for the first segment. Specifically, the global noise estimation unit 110 may calculate the luminance average value blkMean_Y, the block edge strength value blkEdgVar_Y, the block SAD blkSAD_Y in the luminance component Y, and the block SADs blkSAD_U and blkSAD_V in the chrominance components U and V of each current sample block, so as to establish the corresponding noise model.

Figure 6:
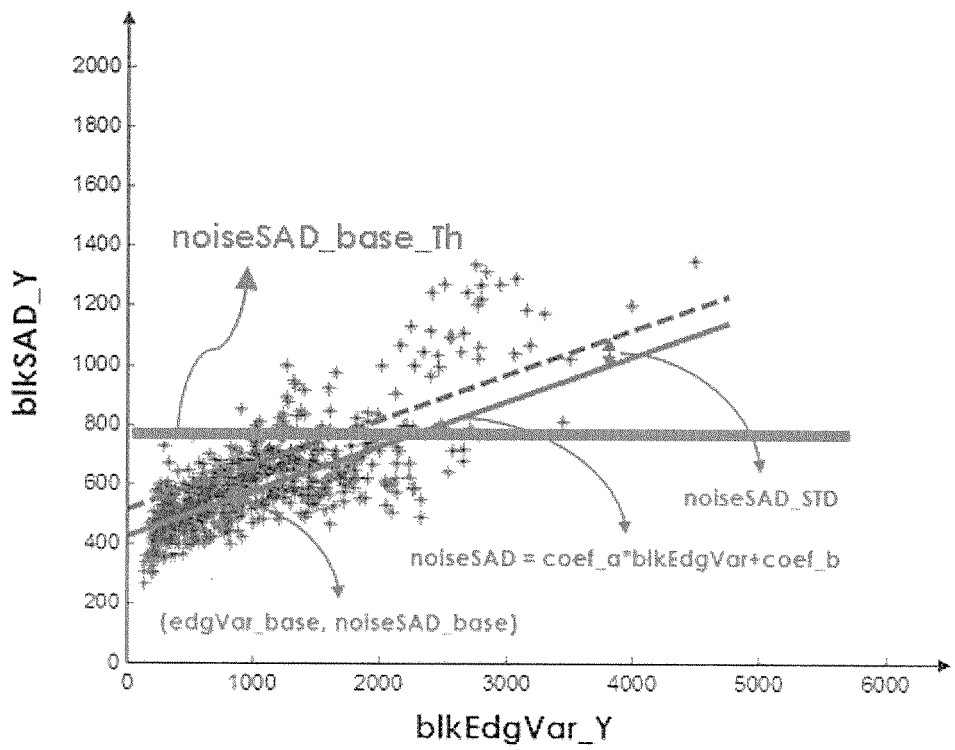
FIGS. 6 to 8 are schematic views illustrating an embodiment of a noise model calculating a luminance component Y in a luminance segment in a coordinate system formed by a sum-of-absolute-difference (SAD) of a block and a block edge strength value.
Figure 7:
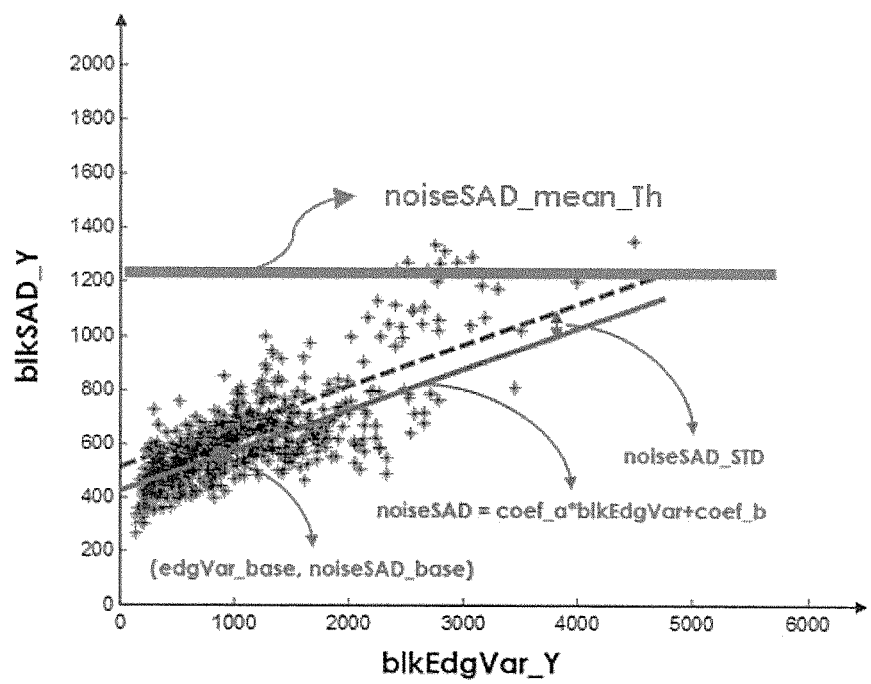
Figure 8:
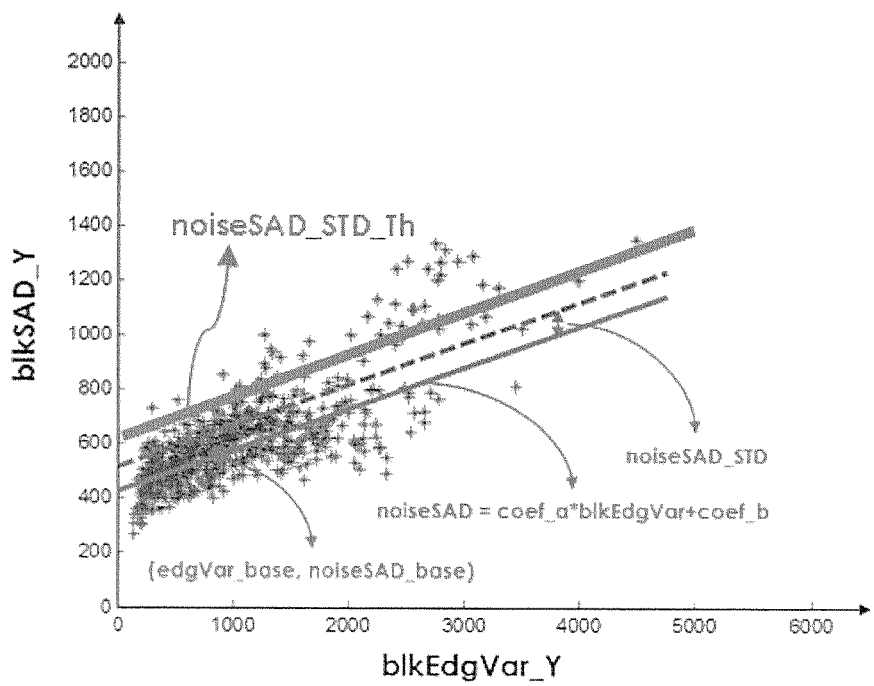

FIGS. 6 to 8 are schematic views illustrating an embodiment of a corresponding noise model calculating a luminance component in a coordinate system formed by a block SAD and a block edge strength value. Since the noise level in the luminance component has the characteristic of increasing as the pixel edge strength increases, the corresponding noise model in the luminance component is a linear model between noise level and edge strength. At Step S240, the global noise estimation unit 110 may choose one of the segments seg0 to seg7 shown in FIG. 5 as a target segment (operations of other segments may be inferred by referring to descriptions about the target segment). Regarding the corresponding noise model of the luminance component, details of calculation of a reference point are described in the following. At Step S240, the global noise estimation unit 110 may choose one or more current sample blocks of the current sample blocks in the target segment as a first block set S1 of the target segment. Here, the block SADs blkSAD_Y of the current sample blocks of the first block set S1 in the luminance component Y are smaller than or equal to a noise reference value threshold noiseSAD_base_Th. The noise reference value threshold noiseSAD_base_Th may be determined based on design or application requirements.

FIG. 6 is a schematic view illustrating calculating a reference point of a corresponding noise model of a luminance component according to an embodiment of the invention. Here, the reference point may represent noise and edge strength characteristics of a flat and static area in an image. A horizontal axis in FIG. 6 represents the block edge strength value blkEdgVar_Y of the current sample block, while a vertical axis of FIG. 6 represents the block SAD blkSAD_Y of the current sample block. A mark "+" shown in FIG. 6 indicates the position of one current sample block in a coordinate system formed by the block edge strength value blkEdgVar_Y and the block SAD blkSAD_Y. In this embodiment, the global noise estimation unit 110 may filter the current sample blocks in the target segment based on Equation (9) in the following to obtain the first block set S1. blkSADi shown in Equation (9) represents the block SAD blkSAD_Y in the $i^{th}$ current sample block in the target segment. In this embodiment, the first block set S1 includes the current sample block in the flat and static area. A filtering condition thereof is that the block SAD blkSAD of the current sample block in the luminance component Y is smaller than or equal to the noise reference value threshold noiseSAD_base_Th. The global noise estimation unit 110 may determine the noise reference value threshold noiseSAD_base_Th based on Equation (10) in the following. blkSAD_Min in Equation (10) represents the minimum the block SADs blkSAD_Yin all the current sample blocks in the target segment. In the embodiment shown in Equation (10), the noise reference value threshold noiseSAD_base_Th is a result of the minimum block SAD blkSAD_Min multiplied by a parameter value k1. The parameter value k1 may be determined based on design or application requirements. For example, the parameter value k1 may be a real number greater than 0 and smaller than or equal to 4.

$$S1 \overset{\Delta}{=} \{i | blkSAD_i \leq noiseSAD\_base\_Th\} \quad (9)$$

$$noiseSAD\_base\_Th = k1 * blkSAD\_Min, \ 0 < k1 \leq 4 \quad (10)$$

Then, at Step S240, the global noise estimation unit 110 may calculate an edge strength reference value edgVar_base of the target segment based on the block edge strength values blkEdgVar_Y of the current sample blocks in the first block set S1, and calculate a noise reference value noiseSAD_base of the target segment based on the block SADs of the current sample blocks of the first block set in the luminance component Y. For example, the global noise estimation unit 110 may calculate the edge strength reference value edgVar_base and the noise reference value noiseSAD_base respectively based on Equations (11) and (12) in the following. In Equation (11), blkEdgVari represents the block edge strength value blkEdgVar_Y of the $i^{th}$ current sample block in the first block set S1, and M1 represents the number of the current sample blocks in the first block set S1. In Equation (12), blkSADi represents the block SAD blkSAD_Y of the $i^{th}$ current sample block in the first block set S1. In this embodiment, the global noise estimation unit 110 clusters a sum of the edge strength values blkEdgVari of all the current sample blocks in the first block set S1 by the block number M1 of the first block set S1 and uses a result of division as the edge strength reference value edgVar_base. The global noise estimation unit 110 clusters a sum of the SADs blkSADi of all the current sample blocks of the first block set S1 in the luminance component by the block number M1 and uses a result of division as the noise reference value noiseSAD_base. Accordingly, the global noise estimation unit 110 may obtain a reference point coordinate (edgVar_base, noiseSAD_base) of the corresponding noise model about the luminance component Y.

$$edgVar\_base = \frac{1}{M1} \sum_{i \in S1} blkEdgVar_i \quad (11)$$

$$noiseSAD\_base = \frac{1}{M1} \sum_{i \in S1} blkSAD_i \quad (12)$$

At Step S240, the global noise estimation unit 110 may further choose one or more current sample blocks in the current sample blocks of the target segment as a second block set S2 of the target segment. Here, the block SADs blkSAD_Y of the current sample blocks of the second block set S2 in the luminance component Y are smaller than or equal to a noise average value threshold noiseSAD_mean_Th. The noise average value threshold noiseSAD_mean_Th may be determined based on design or application requirements.

FIG. 7 is a schematic view illustrating calculating a coefficient value of a corresponding noise model of a luminance component according to an embodiment of the invention. The coefficient describes a tendency as to how the noise level varies with the edge strength. A horizontal axis in FIG. 7 represents the block edge strength value blkEdgVar_Y of the current sample block, while a vertical axis of FIG. 6 represents the block SAD blkSAD_Y of the current sample block. A mark "+" shown in FIG. 7 indicates the position of one current sample block in a coordinate system formed by the block edge strength value blkEdgVar_Y and the block SAD blkSAD_Y. In this embodiment, the global noise estimation unit 110 may filter the current sample blocks in the target segment based on Equation (13) in the following to obtain the second block set S2. blkSADi shown in Equation (13) represents the block SAD blkSAD_Y in the $i^{th}$ current sample block in the target segment. In this embodiment, the second block set S2 includes the current sample blocks used to calculate a first coefficient value coef_1 and a second coefficient value coef_b serving to calculate a linear model parameter. A filtering condition thereof is that the block SAD blkSADi of the current sample block in the luminance component Y is smaller than or equal to the noise average value threshold noiseSAD_mean_Th, and a purpose of filtering is to filter out motion blocks. The global noise estimation unit 110 may determine the noise average value threshold noiseSAD_mean_TH based on Equation (14) in the following. In the embodiment shown in Equation (14), the noise average value threshold noiseSAD_mean_Th is a result of the noise reference value noiseSAD_base multiplied by a parameter value k2. The parameter value k2 may be determined based on design or application requirements. For example, the parameter value k2 may be a real number greater than 0 and smaller than or equal to 4.

$$S2 \triangleq \{i | \text{blkSAD}_i \leq \text{noiseSAD\_mean\_Th}\} \quad (13)$$

$$\text{noiseSAD\_mean\_Th} = k2 * \text{noiseSAD\_base}, \ 0 < k2 \leq 4 \quad (14)$$

Then, based on the edge strength reference value edgVar_base and the noise reference value noiseSAD_base, and based on the block SADs blkSAD_Y and the block edge strength values blkEdgVar_Y of the current sample blocks of the second block set S2 in the luminance component Y, the global noise estimation unit 110 may calculate the first coefficient value coef_a and the second coefficient value coef_b of the target segment at Step S240. For example, the global noise estimation unit 110 may respectively calculate the first coefficient value coef_a and the second coefficient value coef_b of the linear model based on Equations (15), (16), (17), and (18) in the following. In Equation (15), blkEdgVari represents the block edge strength value blkEdgVar_Y of the $i^{th}$ current sample block in the second block set S2. In Equation (16), blkSADi represents the block SAD blkSAD_Y of the $i^{th}$ current sample block in the second block set S2. In this embodiment, the linear model needs to pass through the reference point coordinate (edgVar_base, noiseSAD_base), so as to prevent a noise value of the flat area from being overestimated. Therefore, the global noise estimation unit 110 calculates a variable value data_x(i) based on the edge strength reference value edgeVar_base and the edge strength values blkEdgVari of the current sample blocks of the second block set S2 in the luminance component Y, and calculates a variable value data_y(i) based on the noise reference value noiseSAD_base and the block SAD blkSADi of the current sample block of the second block set S2 in the luminance component Y. Then, the global noise estimation unit 110 calculates the first coefficient value coef_a based on the variable values data_x(i) and data_y(i), and calculates the second coefficient value coef_b based on the edge strength reference value edgVar_base, the noise reference value noiseSAD_base, and the first coefficient coef_a. Accordingly, the global noise estimation unit 110 may obtain a linear model noiseSAD=coef_a*blkEdgVar+coef_b that passes through the reference point coordinate (edgVar_base, noiseSAD_base).

$$\text{data\_x}(i) = \text{blkEdgVar}_i - \text{edgeVar\_base} \quad (15)$$

$$\text{data\_y}(i) = \text{blkSAD}_i - \text{noiseSAD\_base} \quad (16)$$

$$\text{coef\_a} = \frac{\sum_{i \in S2} \text{data\_x}(i) * \text{data\_y}(i)}{\sum_{i \in S2} \text{data\_x}(i) * \text{data\_x}(i)} \quad (17)$$

$$\text{coef\_b} = \text{noiseSAD\_base} - \text{coef\_a} * \text{edgVar\_base} \quad (18)$$

At Step S240, the global noise estimation unit 110 may further choose one or more current sample blocks of the current sample blocks in the target segment as a third block set S3 of the target segment. Here, the block SADs blkSAD_Y of the current sample blocks of the third block set S3 in the luminance component Y are smaller than or equal to a noise standard deviation threshold noiseSAD_STD_Th. The noise standard deviation threshold noiseSAD_STD_Th may be determined based on design or application requirements.

FIG. 8 is a schematic view illustrating a noise standard deviation of a corresponding noise model calculating a luminance component according to an embodiment of the invention. A horizontal axis in FIG. 8 represents the block edge strength value blkEdgVar_Y of the current sample block, while a vertical axis of FIG. 6 represents the block SAD blkSAD_Y of the current sample block. A mark "+" shown in FIG. 8 indicates the position of one current sample block in a coordinate system formed by the block edge strength value blkEdgVar_Y and the block SAD blkSAD_Y. In this embodiment, the global noise estimation unit 110 may filter the current sample blocks in the target segment based on Equations (19), (20), (21), and (22) in the following to obtain the third block set S3. blkSADi shown in Equation (19) represents the block SAD blkSAD_Y in the $i^{th}$ current sample block in the target segment. In this embodiment, the third block set S3 includes the current sample blocks used to calculate the noise standard deviation noiseSAD_STD. A filtering condition thereof is that the block SAD blkSADi of each current block in the luminance component Y is smaller than or equal to the noise standard deviation threshold noiseSAD_STD_Th, and a purpose of filtering is to filter out blocks whose variation is too great. The global noise estimation unit 110 may determine the noise standard deviation threshold noiseSAD_STD_Th based on Equation (20) in the following. noiseSAD_Meani shown in Equation (20) represents the noise average value noiseSAD_Mean of the $i^{th}$ current sample block in the target segment. In the embodiment shown in Equation (20), the noise standard deviation threshold noiseSAD_STD_Th is determined based on the noise average value noiseSAD_Meani of each current sample block in the target segment and a roughly estimated variation range noise_SAD_STD_rough.

$$S3 \triangleq \{i | \text{blkSAD}_i \leq \text{noiseSAD\_STD\_Th}\} \quad (19)$$

$$\text{noiseSAD\_STD\_Th} = \text{noiseSAD\_Mean}_i - \text{noiseSAD\_STD\_rough} \quad (20)$$

$$\text{noiseSAD\_Mean}_i = \text{coef\_a} * \text{blkEdgVar}_i + \text{coef\_b} \quad (21)$$

$$\text{noiseSAD\_STD\_rough} = \frac{\text{noiseSAD\_base}}{k3}, \ 2 \leq k3 \leq 8 \quad (22)$$

At Step S240, the global noise estimation unit 110 may calculate the noise average value noiseSAD_Meani of the target segment based on the first coefficient value coef_a and the second coefficient value coef_b of the target segment and the edge strength value blkEdgVari of the current sample block in the third block set S3. Accordingly, the global noise estimation unit 110 may obtain the noise average value noiseSAD_Meani of the corresponding noise model about the luminance component Y. The global noise estimation unit 110 may further determine the rough noise variation range noiseSAD_STD_rough based on the noise reference value noiseSAD_base of the target segment and a parameter value k3 at Step S240. The parameter value k3 may be determined based on design or application requirements. For example, the parameter value k3 may be a real number greater than or equal to 2 and smaller than or equal to 8.

Then, the global noise estimation unit 110 may calculate the noise standard deviation noiseSAD_STD of the target segment based on the block SADs blkSAD_Y in the luminance component Y and the noise average values noiseSAD_Meani of the current sample blocks of the third block set S3 at Step S240. For example, the global noise estimation unit 110 may calculate the noise standard deviation noiseSAD_STD based on Equation (23) in the following. In Equation (23), blkSADi represents the block SAD blkSAD_Y of the $i^{th}$ current sample block in the third block set S3, noiseSAD_Meani represents the noise average value noiseSAD_Mean of the $i^{th}$ current sample block in the third block set S3, and M3 represents the number of the current sample blocks in the third block set S3. In this embodiment, the global noise estimation unit 110 sums up absolute values obtained by subtracting the block SADs blkSADi from the noise average values noiseSAD_Meani of the respective current sample blocks in the third block set S3. The absolute values are clustered by the block number M3 of the third block set S3, so as to obtain the noise standard deviation noiseSAD_STD. Accordingly, the global noise estimation unit 110 may obtain the noise standard deviation noiseSAD_STD in the corresponding noise model about the luminance component Y.

$$\text{noiseSAD\_STD} = \frac{1}{M3} \sum_{i \in S3} |blkSAD_i - \text{noiseSAD\_Mean}_i| \quad (23)$$

At Step S240, the global noise estimation unit 110 may respectively calculate the noise average values noiseSAD_Mean and the noise standard deviations noiseSAD_STD of each segment in the chrominance components U and V as the noise models. In the following, details of the noise model of the chrominance component U are described. The noise model of the chrominance component V may be inferred by referring to the descriptions related to the chrominance component U.

Figure 9:
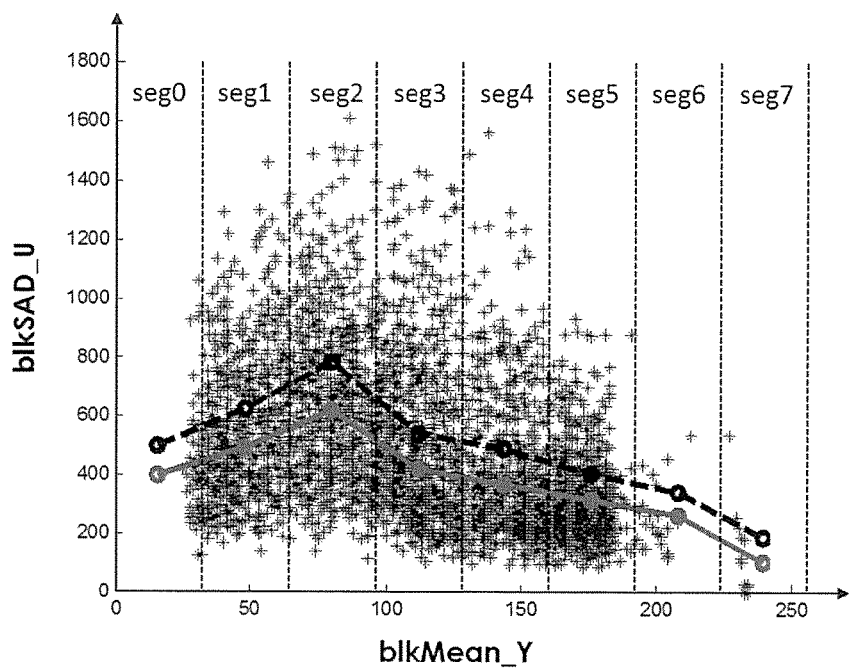
FIG. 9 is a schematic view illustrating a noise model calculating a chrominance component according to an embodiment of the invention.

For example, FIG. 9 is a schematic view illustrating a corresponding noise model calculating a chrominance component according to an embodiment of the invention. Since the characteristic of increasing as the pixel edge strength increases in the noise level is not significant in the chrominance component, the corresponding noise model of the chrominance component does not take the relation between the noise level and the edge strength into consideration. A horizontal axis of FIG. 9 represents the luminance average value blkMean_Y of the current sample block, while a vertical axis of FIG. 9 represents a block SAD blkSAD_U of the current sample block. A mark "+" shown in FIG. 9 indicates the position of one current sample block in a coordinate system formed by the luminance average value blkMean_Y and the block SAD blkSAD_U. At Step S240, the global noise estimation unit 110 may choose one of the segments seg0 to seg7 shown in FIG. 9 as a target segment (operations of other segments may be inferred by referring to descriptions about the target segment). At Step S240, the global noise estimation unit 110 may choose one or more current sample blocks of the current sample blocks in the target segment as a fourth block set S4 of the target segment. Here, the block SADs blkSAD_U of the current sample blocks of the fourth block set S4 in the chrominance component U are smaller than or equal to the noise average value threshold noiseSAD_mean_Th. The noise average value threshold noiseSAD_mean_Th may be determined based on design or application requirements.

In this embodiment, the global noise estimation unit 110 may filter the current sample blocks in the target segment based on Equations (24) and (25) in the following to obtain the fourth block set S4. blkSADi shown in Equation (24) represents the block SAD blkSAD_U in the $i^{th}$ current sample block in the target segment. In this embodiment, the fourth block set S4 includes the current sample blocks used to calculate the noise average value. A filtering condition thereof is that the block SAD blkSADi of the current sample block in the chrominance component U is smaller than or equal to the noise average value threshold noiseSAD_mean_Th, and a purpose of filtering is to filter out motion current sample blocks. blkSAD_Min in Equation (25) represents the minimum block SADs blkSAD_U in all the current sample blocks in the target segment. In the embodiment shown in Equation (25), the noise average value threshold noiseSAD_mean_Th is a result of the minimum block SAD blkSAD_Min multiplied by a parameter value k4. The parameter value k4 may be determined based on design or application requirements. For example, the parameter value k4 may be a real number greater than 0 and smaller than or equal to 8.

$$S4 \overset{\Delta}{=} \{i | blkSAD_i \leq \text{noiseSAD\_mean\_Th}\} \quad (24)$$

$$\text{noiseSAD\_Mean\_Th} = k4 * blkSAD\_Min, \ 0 \leq k4 \leq 8 \quad (25)$$

Then, the global noise estimation unit 110 may calculate the noise average value noiseSAD_Mean of the target segment based on the block SADs blkSAD_U in the chrominance component U of the current sample blocks in the fourth block set S4 at Step S240. For example, the global noise estimation unit 110 may calculate the noise average value based on Equation (26) in the following. In Equation (26), blkSADi represents the block SAD blkSAD_U of the $i^{th}$ current sample block in the fourth block set S4, and M4 represents the number of the current sample blocks in the fourth block set S4. In this embodiment, the global noise estimation unit 110 sums up the block SADs blkSADi of the respective current sample blocks in the fourth block set S4 and clusters the sum of the block SADs blkSADi by the block number M4 of the fourth block set S4 to obtain the noise average value noiseSAD_Mean. Accordingly, the global noise estimation unit 110 may obtain the noise average value noiseSAD_Mean of the corresponding noise model about the chrominance component U.

$$\text{noiseSAD\_Mean} = \frac{1}{M4} \sum_{i \in S4} blkSAD_i \quad (26)$$

At Step S240, the global noise estimation unit 110 may further choose one or more current sample blocks of the current sample blocks in the target segment as a fifth block set S5 of the target segment. Here, the block SADs blkSAD_Y of the current sample blocks of the fifth block set S5 in the chrominance component U are smaller than or equal to the noise standard deviation threshold noiseSAD_STD_Th. Referring to FIG. 9 again, in this embodiment, the global noise estimation unit 110 may filter the current sample blocks in the target segment based on Equations (27), (28) and (29) in the following to obtain the fifth block set S5. blkSADi shown in Equation (27) represents the block SAD blkSAD_U in the $i^{th}$ current sample block in the target segment. In this embodiment, the fifth block set S5 includes the current sample blocks used to calculate the noise standard deviation noiseSAD_STD. A filtering condition thereof is that the block SAD blkSADi of each current block in the chrominance component U is smaller than or equal to the noise standard deviation threshold noiseSAD_STD_Th, and a purpose of filtering is to filter out blocks whose variation is too great. The global noise estimation unit 110 may determine the noise standard deviation threshold noiseSAD_STD_Th based on Equations (28) and (29) in the following. noiseSAD_Mean shown in Equation (28) represents the noise average value of the target segment, and noiseSAD_STD_rough represents a rough noise variation range of the target segment. In the embodiment shown in Equations (28) and (29), the noise standard deviation threshold noiseSAD_STD_Th is determined based on the noise average value noiseSAD_Mean and the rough noise variation range noiseSAD_STD_rough of the target segment. In addition, the rough noise variation range noiseSAD_STD_rough is determined based on the noise average value noiseSAD_Mean of the target segment and a parameter value k5. The parameter value k5 may be determined based on design or application requirements. For example, the parameter value k5 may be a real number greater than or equal to 2 and smaller than or equal to 8.

$$S5 \triangleq \{i \mid blkSAD_i \leq \text{noiseSAD\_STD\_Th}\} \quad (27)$$

$$\text{noiseSAD\_STD\_Th} = \text{noiseSAD\_Mean} + \text{noiseSAD\_STD\_rough} \quad (28)$$

$$\text{noiseSAD\_STD\_rough} = \frac{\text{noiseSAD\_mean}}{k5}, 2 \leq k5 \leq 8 \quad (29)$$

Then, the global noise estimation unit 110 may calculate the noise standard deviation noiseSAD_STD of the target segment based on the block SADs blkSAD_U of the current sample blocks of the fifth block set S5 and the noise average value noiseSAD_Mean at Step S240. For example, the global noise estimation unit 110 may calculate the noise standard deviation noiseSAD_STD based on Equation (30) in the following. In Equation (30), blkSADi represents the block SAD blkSAD_U of the $i^{th}$ current sample block in the fifth block set S5, noiseSAD_Mean represents the noise average value of the target segment, and M5 represents the number of the current sample blocks in the fifth block set S5. In this embodiment, the global noise estimation unit 110 sums up absolute values obtained by subtracting the block SADs blkSADi of the respective current sample blocks in the fifth block set S5 from the noise average value noiseSAD_Mean. The sum is clustered by the block number M5 of the fifth block set S5, so as to obtain the noise standard deviation noiseSAD_STD. Accordingly, the global noise estimation unit 110 may obtain the noise standard deviation noiseSAD_STD in the corresponding noise model about the chrominance component U.

$$\text{noiseSAD\_STD} = \frac{1}{M5} \sum_{i \in S5} |blkSAD_i - \text{noiseSAD\_Mean}| \quad (30)$$

In addition, the noise average value noiseSAD_Mean and the noise standard deviations noiseSAD_STD of the corresponding noise model about the chrominance component V may be inferred based on the calculation of the corresponding noise model of the chrominance component U. Therefore, details in this regard will not be repeated in the following.

Referring to FIG. 2, at Step S250, the local noise calculation unit 120 calculates the noise level information of the local image block of the current image frame based on the noise model. Specifically, the local noise calculation unit 120 may calculate the noise level information of the local image block of the current image frame based on the noise models established in the luminance component Y and the chrominance components U and V respectively by the global noise estimation unit 110 at Step S240.

Figure 10:
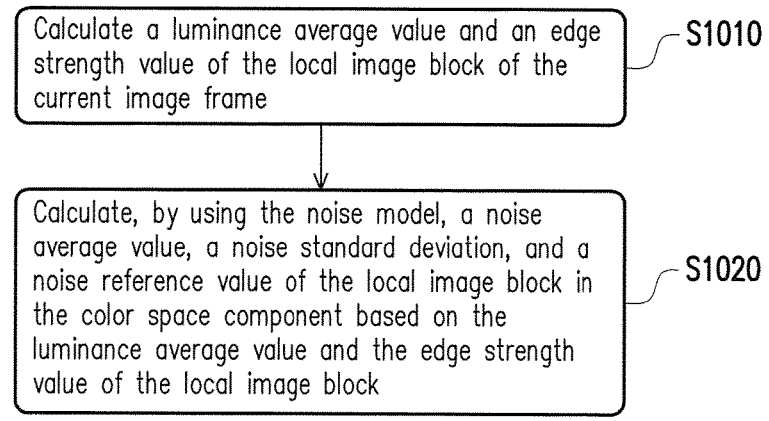
FIG. 10 is a schematic flowchart illustrating details of Step S250 of FIG. 2 according to an embodiment of the invention.

FIG. 10 is a schematic flowchart illustrating details of Step S250 of FIG. 2 according to an embodiment of the invention. Referring to FIGS. 1 and 10, at Step S1010, the local noise calculation unit 120 serves to receive the current image frame I(t) and calculate the luminance average value blkMean_Y and the edge strength value blkEdgVar_Y of the local image block of the current image frame I(t). At Step S1020, based on the luminance average value blkMean_Y and the edge strength value blkEdgVar_Y of the local image block, the local noise calculation unit 120 calculates the noise average values, the noise standard deviations, and the noise reference values of the local image block in the respective color space components based on the noise models provided by the global noise estimation unit 110.

Figure 11:
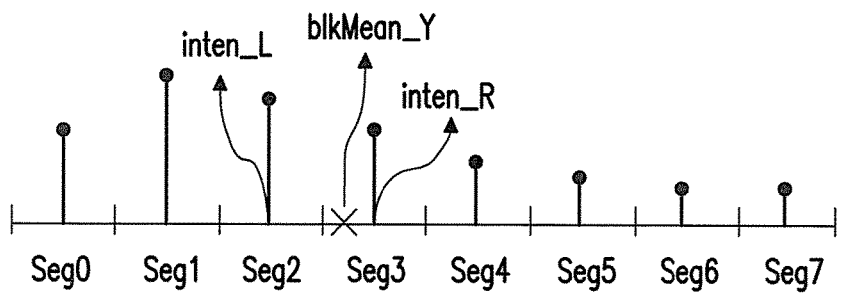
FIG. 11 is a schematic view illustrating a noise average value of a local image block in a luminance component.

For example, FIG. 11 is a schematic view illustrating a noise average value of a local image block in a luminance component. A horizontal axis of FIG. 11 represents the luminance average value of the block, and a vertical axis of FIG. 11 represents the noise average value noiseSAD_Mean. In addition, "X" represents the luminance average value of a local block. In this embodiment, the local noise calculation unit 120 determines an adjacent left-side segment (e.g., the segment Seg2) and an adjacent right-side segment (e.g., the segment Seg3) of the local image block based on the luminance average value blkMean_Y of the local image block of the current image frame I(t), and calculates noise average values noiseSAD_Mean_L and noiseSAD_Mean_R of the left-side segment and the right-side segment based on Equations (31) and (32) in the following. In Equations (31) and (32), coef_a_L represents the first coefficient value coef_a of the adjacent left-side segment Seg2, coef_a_L represents the second coefficient value coef_b of the adjacent left-side segment Seg2, coef_a_R represents the first coefficient value coef_a of the adjacent right-side segment Seg3, and coef_b_R represents the second coefficient value coef_b of the adjacent right-side segment Seg3. The noise average values of the left-side and right-side segments are determined based on the edge strength value blkEdgVar_Y of the local image block and the first coefficients coef_a_L and coef_a_R and the second coefficients coef_b_L and coef_b_R of the left-side and right-side segments.

$$\text{noiseSAD\_Mean}\_L = \text{coef}\_a\_L * \text{blkEdgVar}\_Y + \text{coef}\_b\_L \quad (31)$$

$$\text{noiseSAD\_Mean}\_R = \text{coef}\_a\_R * \text{blkEdgVar}\_Y + \text{coef}\_b\_R \quad (32)$$

Then, the local noise calculation unit 120 obtains a noise average value noiseSAD_Mean_Interp of the local image block by linear interpolation based on Equation (33) in the following. In Equation (33), blkMean_Y represents the luminance average value of the local image block in the current image frame I(t), inten_L represents a luminance intermediate value of the adjacent left-side segment Seg2, and inten_R represents a luminance intermediate value of the adjacent right-side segment Seg3.

$$\text{noiseSAD\_Mean\_Interp} = \qquad (33)$$
$$\frac{(\text{intern\_R} - \text{blkMean\_Y}) * \text{noiseSAD\_Mean\_L} + (\text{blkMean\_Y} - \text{intern\_L}) * \text{noiseSAD\_Mean\_R}}{\text{intern\_R} - \text{intern\_L}}$$

In this embodiment, the noise average values, the noise standard deviations, and the noise reference values of the local image block of the current image frame I(t) in the respective color space components may be inferred by referring to the noise average value noiseSAD_Mean_Interp of the local image block in the luminance component Y. Thus, details in this regard will not be repeated in the following.

Figure 12:
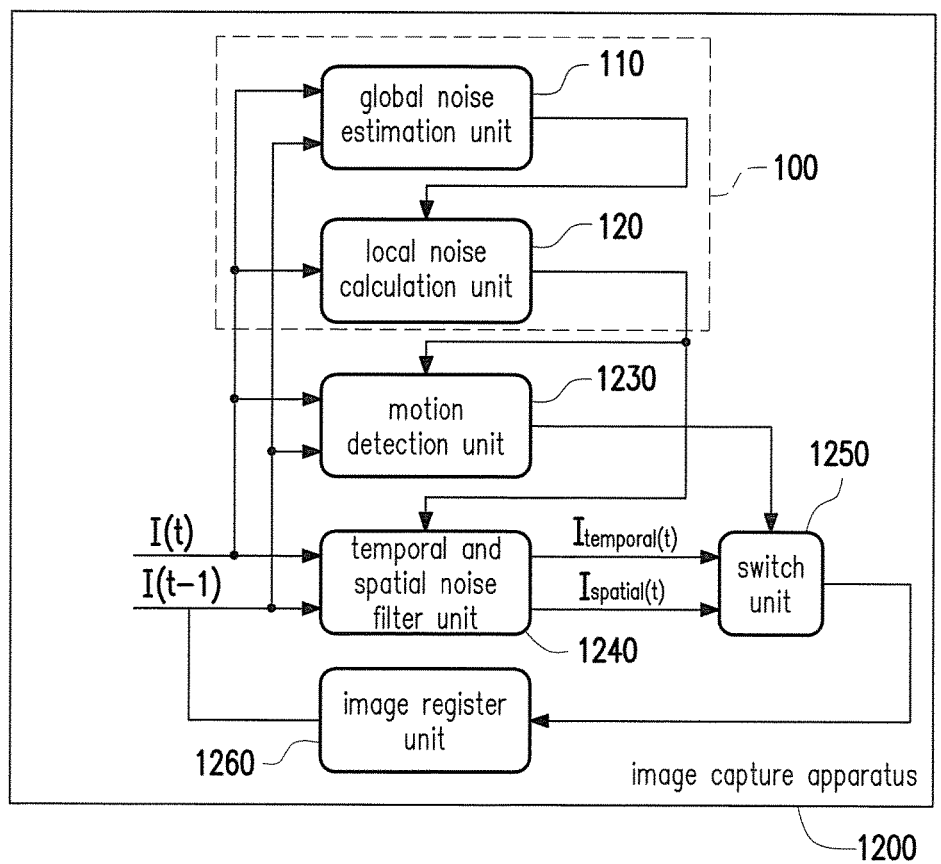
FIG. 12 is a circuit block view illustrating a device for image noise estimation according to another embodiment of the invention.

FIG. 12 is a circuit block view illustrating a device for image noise estimation according to another embodiment of the invention. Referring to FIG. 12, an image capture apparatus 1200 includes the device 100 for image noise estimation, a motion detection unit 1230, a temporal and spatial noise filter unit 1240, a switch unit 1250, and an image register unit 1260. The image capture apparatus 1200 is a digital camera, a digital video recorder, a smart phone, a personal digital assistant (PDA) a tablet computer, a notebook computer, a smart glass, a smart watch, or other fixed or portable apparatuses, for example. The device 100 for image noise estimation includes the global noise estimation unit 110 and the local noise calculation unit 120. In this embodiment, the global noise estimation unit 110 receives the current image frame I(t) and the previous image frame I(t−1). The global noise estimation unit 110 serves to analyze the current image frame I(t) and the previous image frame I(t−1) to establish a noise model. The local noise calculation unit 120 is connected to the global noise estimation unit 110. Based on the corresponding noise model established by the global noise estimation unit 110, the local noise calculation unit 120 may perform feature capturing to the local image block in the current image frame I(t) and use the corresponding noise model to obtain the noise level information of the local image block. The local noise calculation unit 120 may provide the noise level information of the local image block to the motion detection unit 1230 and the temporal and spatial noise filter unit 1240. Details about the device 100 for image noise estimation, the global noise estimation unit 110, and the local noise calculation unit 120 of this embodiment may be referred to the descriptions related to FIGS. 1 to 11, and thus will not be repeated in the following.

The motion detection unit 1230, the temporal and spatial noise filter unit 1240, the switch unit 1250, and the image register unit 1260 may be implemented by means of software or firmware, by means of hardware (circuit), or by means of combination of software and hardware. In an example where the device 100 for image noise estimation is implemented by means of hardware, the motion detection unit 1230 may be a motion detection circuit, the temporal and spatial noise filter unit 1240 may be a temporal and spatial noise filter circuit, the switch unit 1250 may be a switch circuit, and the image register unit 1260 may be an image register circuit. It should be noted that the invention does not intend to impose limitation on implementation and computation details of the motion detection unit 1230, the temporal and spatial noise filter unit 1240, the switch unit 1250, and the image register unit 1260. In some embodiments, the motion detection unit 1230, the temporal and spatial noise filter unit 1240, the switch unit 1250, and the image register unit 1260 may be conventional algorithms, components, and/or circuits.

In this embodiment, the motion detection unit 1230 is connected to the local noise calculation unit 120. The motion detection unit 1230 serves to perform motion detection to the local image block. The motion detection unit 1230 may determine a motion detection threshold based on the noise average value and the noise standard deviation of the local image block in the color space component (e.g., the luminance component Y). Based on the motion detection threshold, the motion detection unit 1230 may determine whether the local image block is in a static state or a motion state. Based on the current image frame I(t) and the previous image frame I(t−1), the temporal and spatial noise filter unit 1240 may calculate a temporal noise filter result $I_{temporal}(t)$ or a spatial noise filter result $I_{spatial}(t)$. The switch unit 1250 is connected to the temporal and spatial noise filter unit 1240. The switch unit 1250 serves to determine whether to choose the temporal noise filter result $I_{temporal}(t)$ or the spatial noise filter result $I_{spatial}(t)$ based on a result of motion detection of the motion detection unit 1230. When the local image block is in the static state, the switch unit 1250 may choose to output the temporal noise filter result $I_{temporal}(t)$ to the image register unit 1260. When the local image block is in the motion state, the switch unit 1250 may choose to output the spatial noise filter result $I_{spatial}(t)$ to the image register unit 1260. The image register unit 1260 is connected to the switch unit 1250 and serves to temporarily store the temporal noise filter result $I_{temporal}(t)$ or the spatial noise filter result $I_{spatial}(t)$ output by the switch unit 1250. Details with respect to motion detection of the luminance component Y and the chrominance components U and V are described in the following.

To begin with, the motion detection of the luminance component Y is described in the following. The motion detection unit 1230 may determine whether the state of the local image block is the static state or the motion state based on Equations (34) and (35) in the following. For example, the motion detection unit 1230 may determine the motion detection threshold motionTh_Y based on the noise average value noiseSAD_Mean_Y and the noise standard deviation noiseSAD_STD_Y of the local image block in the luminance component calculated by the local noise calculation unit 1220. The motion detection unit 1230 may determine whether the local image block is in the static state by determining whether the block SAD blkSAD_Y of the local image block is smaller than or equal to the motion detection threshold motionTh_Y. If the block SAD blkSAD_Y of the local image block is not smaller than or equal to the motion detection threshold motionTh_Y, it is determined that the local image block is in the motion state.

$$\text{motionTh\_Y} = \text{noiseSAD\_Mean\_Y} + k\_Y * \text{noiseSAD\_STD\_Y}, \qquad (34)$$
$$0 \le k\_Y < 8$$

$$\text{blkMotionState\_Y} = \begin{cases} \text{Static if blkSAD\_Y} \le \text{motionTh\_Y} \\ \text{Motion else} \end{cases} \qquad (35)$$

The temporal and spatial noise filter unit 1240 serves to respectively output the temporal noise filter result and the spatial noise filter result of the local image block. Specifically, the temporal and spatial noise filter unit 1240 determines a filter strength of the temporal noise filter result based on the noise average value noiseSAD_MeanY calculated by the global noise estimation unit 1210 and the local noise calculation unit 1220. In addition, the temporal and spatial noise filter unit 1240 determines a filter strength of the spatial noise filter result based on the noise reference value noiseSAD_base_Y calculated by the global noise estimation unit 1210 and the local noise calculation unit 1220.

In this embodiment, the switch unit 1250 may determine the noise filter result of the local image block based on Equation (36) in the following. When the local image block is in the static state, the switch unit 1250 outputs the temporal noise filter result of the local image block to the image register unit 1260, and when the local image block is in the motion state, the switch unit 1250 outputs the spatial noise filter result of the local image block to the image register unit 1260.

$$Y \text{ of } I_{out}(t) = \begin{cases} Y \text{ of } I_{temporal}(t) \text{ if } \text{blkMotionState\_Y} = \text{Static} \\ Y \text{ of } I_{spatial}(t) \text{ if } \text{blkMotionState\_Y} = \text{Motion} \end{cases} \quad (36)$$

Then, the motion detection of the chrominance component U is described in the following. The motion detection unit 1230 may determine whether the state of the local image block is the static state or the motion state based on Equations (37) and (38) in the following. For example, the motion detection unit 1230 may determine a motion detection threshold motionTh_U based on a noise average value noiseSAD_Mean_U and a noise standard deviation noiseSAD_STD_U of the local image block in the chrominance component U calculated by the local noise calculation unit 1220. The motion detection unit 1230 may determine whether the local image block is in the static state by determining whether a block SAD blkSAD_U of the local image block is smaller than or equal to the motion detection threshold motionTh_U. If the block SAD blkSAD_U of the local image block is not smaller than or equal to the motion detection threshold motionTh_U, it is determined that the local image block is in the motion state.

$$\text{motionTh\_U} = \text{noiseSAD\_Mean\_U} + k\_U * \text{noiseSAD\_STD\_U}, \quad (37)$$
$$0 < k\_U \le 8$$

$$\text{blkMotionState\_U} = \begin{cases} \text{Static if blkSAD\_U} \le \text{motionTh\_U} \\ \text{Motion else} \end{cases} \quad (38)$$

The temporal and spatial noise filter unit 1240 serves to respectively output the temporal noise filter result and the spatial noise filter result of the local image block. Specifically, the temporal and spatial noise filter unit 1240 determines a filter strength of the temporal noise filter result and a filter strength of the spatial noise filter result based on the noise average value noiseSAD_MeanU calculated by the global noise estimation unit 1210 and the local noise calculation unit 1220.

In this embodiment, the switch unit 1250 may determine the noise filter result of the local image block based on Equation (39) in the following. When the local image block is in the static state, the switch unit 1250 outputs the temporal noise filter result $I_{temporal}(t)$ of the local image block to the image register unit 1260, and when the local image block is in the motion state, the switch unit 1250 outputs the spatial noise filter result $I_{spatial}(t)$ of the local image block to the image register unit 1260.

$$U \text{ of } I_{out}(t) = \begin{cases} U \text{ of } I_{temporal}(t) \text{ if } \text{blkMotionState\_U} = \text{Static} \\ U \text{ of } I_{spatial}(t) \text{ if } \text{blkMotionState\_U} = \text{Motion} \end{cases} \quad (39)$$

In addition, the motion detection and the determination of the noise filter result of the local image block with regard to the chrominance component V may be obtained in a manner similar to the motion detection and the determination of the noise filter result of the local image block with regard to the chrominance component U. Thus, details in this regard will not be repeated in the following.

Figure 13:
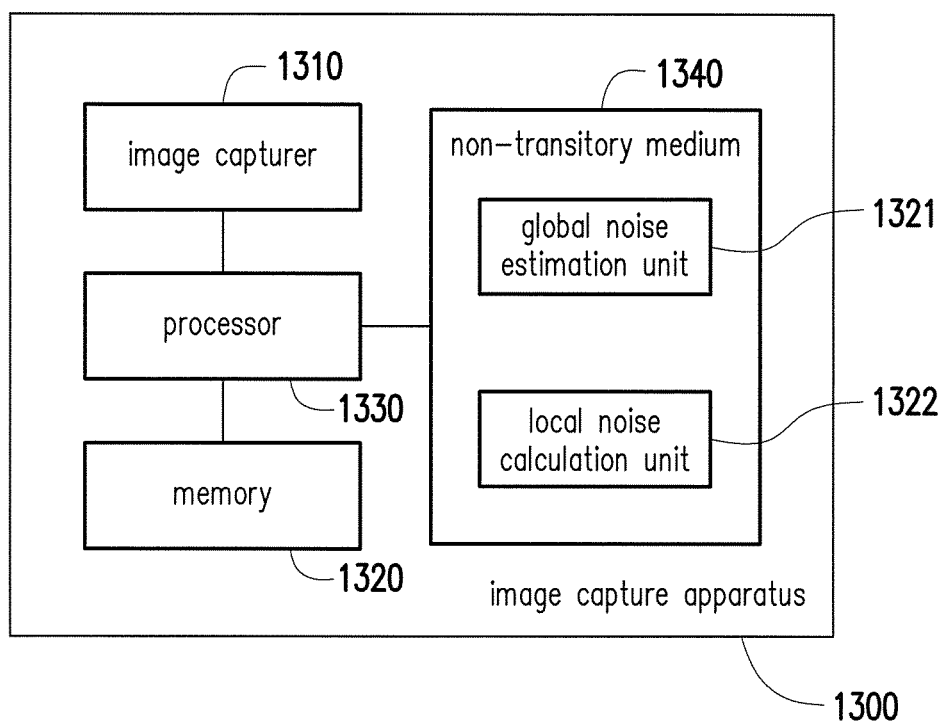
FIG. 13 is a schematic circuit block view illustrating an image capture apparatus according to yet another embodiment of the invention.

FIG. 13 is a schematic circuit block view illustrating an image capture apparatus 1300 according to yet another embodiment of the invention. Referring to FIG. 13, the image capture apparatus 1300 includes an image capturer 1310, a memory 1320, a processor 1330, and a non-transitory medium 1340. The image capturer 1310 serves to capture the current image frame. Based on design requirements, the image capturer 1310 may be a camera or a video recorder. In some embodiments, the image capturer 1310 may include an optical focus-fixed lens or an optical focus-variable lens and an image sensing device such as a charge coupled device (CCD) or a complementary metal-oxide semiconductor (CMOS) device. However, it should be noted herein that the invention is not limited thereto.

The memory 1320 serves to store the previous image frame and the current image frame to be provided to the processor 1330. The memory 1320 may be any kind of fixed or removable random access memory (RAM), read-only memory (ROM), flash memory, similar devices, or a combination thereof, for example. The non-transitory medium 1340 serves to store a program. The non-transitory medium 1340 is, for example, any kind of fixed or removable hard drive or non-volatile memory, such as ROM, flash memory, similar devices, or a combination thereof, for example.

The processor 1330 is, for example, a central processing unit (CPU), a programmable general-purpose or specific-purpose microprocessor, a digital signal processor (DSP), a programmable controller, an application specific integrated circuit (ASIC), a programmable logic device (PLD), other similar devices, or a combination thereof, for example. The processor 1330 connects the non-transitory medium 1340, the image capturer 1310, and the memory 1320. The processor 1330 may access the memory 1320, so as to store the current image frame captured by the image capturer 1310 in the memory 1320 or retrieve the previous image frame from the memory 1320. The processor 1330 may further execute the program of the non-transitory medium 1340. The program at least includes the global noise estimation unit 1321 and the local noise calculation unit 1322.

The global noise estimation unit 1321 serves to determine the current sample blocks in the current image frame and the previous sample blocks in the previous image frame. The global noise estimation unit 1321 serves to calculate the block feature of each current sample block. The global noise estimation unit 1321 serves to calculate the block SAD between each current sample block and the corresponding previous sample block in the color space component. The noise estimation unit 1321 serves to cluster the current sample blocks into the segments based on the block features. The global noise estimation unit 1321 serves to establish the noise model for each segment based on the block features and the block SADs. The local noise calculation unit 1322 serves to calculate the noise level information of the local image block of the current image frame based on a corresponding noise model of the noise models. Details of operation of the global noise estimation unit 1321 shown in FIG. 13 may be inferred by referring to relevant descriptions about the global noise estimation unit 110 shown in FIGS. 1 and 12, and details of operation of the local noise calculation unit 1322 may be inferred by referring to relevant descriptions about the local noise calculation unit 120 shown in FIGS. 1 and 12. Therefore, details in these respects will not be repeated in the following.

In view of the foregoing, the device for image noise estimation and the image capture apparatus according to the embodiments of the invention perform noise estimation to two image frames by temporal noise estimation. In the embodiments, the noise model is established by taking the relation between block feature (including luminance and edge strength) and noise level into consideration and eliminating motion state and the sample blocks whose range of variation is too great. Thus, with the embodiments, the accuracy of image noise estimation may be improved. In addition, the noise model may focus on calculation of the local image block in the image frame, so as to obtain the relevant noise level information of the local image block. In some examples of application, the relevant noise level information of the local image blocks may further serve for motion detection and temporal and spatial noise filtering.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for image noise estimation, wherein the method comprises following steps:
   determining, by a global noise estimation unit of an image capture device, a plurality of current sample blocks in a current image frame and a plurality of previous sample blocks in a previous image frame;
   calculating, by the global noise estimation unit of the image capture device, a block feature in each of the current sample blocks, and calculating a block sum-of-absolute-difference (SAD) between each of the current sample blocks and a corresponding previous sample block of the previous sample blocks in at least one color space component;
   clustering, by the global noise estimation unit of the image capture device, the current sample blocks into a plurality of segments based on the block features;
   respectively establishing, by the global noise estimation unit of the image capture device, a noise model for each of the segments based on the block features and the block SADs; and
   calculating, by a local noise calculation unit of the image capture device, noise level information of a local image block of the current image frame based on a corresponding noise model of the noise models.

2. The method for image noise estimation as claimed in claim 1, wherein the step of determining the current sample blocks in the current image frame and the previous sample blocks in the previous image frame comprises:
   calculating, by the global noise estimation unit of the image capture device, a sample step value based on a sample number to determine sample positions of the current sample blocks and the previous sample blocks.

3. The method for image noise estimation as claimed in claim 1, wherein the step of calculating the block feature in each of the current sample blocks comprises:
   respectively calculating, by the global noise estimation unit of the image capture device, a luminance average value of a plurality of pixels of each of the current sample blocks as the block feature.

4. The method for image noise estimation as claimed in claim 3, wherein the step of calculating the block feature in each of the current sample blocks further comprises:
   calculating, by the global noise estimation unit of the image capture device, a pixel edge strength value of each of the pixels in each of the current sample blocks; and
   respectively calculating, by the global noise estimation unit of the image capture device, a block edge strength value of each of the current sample blocks based on the pixel edge strength values of the pixels.

5. The method for image noise estimation as claimed in claim 4, wherein the step of calculating the pixel edge strength value of each of the pixels in each of the current sample blocks comprises:
   calculating, for a current pixel of the pixels, a weighted average value of the current pixel and a plurality of adjacent pixels by the global noise estimation unit of the image capture device;
   calculating, by the global noise estimation unit of the image capture device, a first absolute difference between the current pixel and the weighted average value;
   respectively calculating, by the global noise estimation unit of the image capture device, a plurality of second absolute differences between the adjacent pixels and the weighted average value; and
   calculating, by the global noise estimation unit of the image capture device, a sum of the first absolute difference and the second absolute differences as the pixel edge strength value of the current pixel.

6. The method for image noise estimation as claimed in claim 4, wherein the step of calculating the block edge strength value of each of the current sample blocks comprises:
   calculating, in a sample block of the current sample blocks, a sum of the pixel edge strength values of the pixels of the sample block as the block edge strength value of the sample block by the global noise estimation unit of the image capture device.

7. The method for image noise estimation as claimed in claim 4, wherein the step of clustering the current sample blocks into the segments based on the block features comprises:
   obtaining, by the global noise estimation unit of the image capture device, a plurality of filtered current sample blocks by filtering the current sample blocks based on the luminance average value and the block edge strength value of each of the current sample blocks, wherein the luminance average values of the filtered current sample blocks are in a range of a predetermined minimum luminance average threshold to a predetermined maximum luminance average threshold, and the block edge strength values of the filtered current sample blocks are smaller than a predetermined edge strength value threshold; and
   clustering, by the global noise estimation unit of the image capture device, the filtered current sample blocks into the segments based on the luminance average values of the filtered current sample blocks.

8. The method for image noise estimation as claimed in claim 4, wherein the color space component is a luminance component, and the step of establishing the noise model comprises:
respectively calculating, by the global noise estimation unit of the image capture device, a noise average value and a noise standard deviation of each of the segments in the luminance component as the noise model.

9. The method for image noise estimation as claimed in claim 8, wherein the step of calculating the noise average value and the noise standard deviation comprises:
choosing, by the global noise estimation unit of the image capture device, one of the segments as a target segment;
choosing, by the global noise estimation unit of the image capture device, at least one of the current sample blocks in the target segment as a first block set of the target segment, wherein the block SADs of the current sample blocks of the first block set in the luminance component are smaller than or equal to a noise reference value threshold;
calculating, by the global noise estimation unit of the image capture device, an edge strength reference value of the target segment based on the block edge strength values of the current sample blocks in the first block set; and
calculating, by the global noise estimation unit of the image capture device, a noise reference value of the target segment based on the block SADs of the current sample blocks of the first block set in the luminance component.

10. The method for image noise estimation as claimed in claim 9, wherein the step of calculating the noise average value and the noise standard deviation further comprises:
choosing, by the global noise estimation unit of the image capture device, at least one of the current sample blocks in the target segment as a second block set of the target segment, wherein the block SADs of the current sample blocks of the second block set in the luminance component are smaller than or equal to a noise average value threshold; and
calculating, by the global noise estimation unit of the image capture device, a first coefficient value and a second coefficient value of the target segment based on the edge strength reference value and the noise reference value and based on the block SADs and the block edge strength values of the current sample blocks of the second block set in the luminance component.

11. The method for image noise estimation as claimed in claim 10, wherein the step of calculating the noise average value and the noise standard deviation further comprises:
choosing, by the global noise estimation unit of the image capture device, at least one of the current sample blocks in the target segment as a third block set of the target segment, wherein the block SADs of the current sample blocks of the third block set in the luminance component are smaller than or equal to a noise standard deviation threshold;
calculating, by the global noise estimation unit of the image capture device, the noise average value of the target segment based on the first coefficient value and the second coefficient value and based on the edge strength values of the current sample blocks in the third block set; and
calculating, by the global noise estimation unit of the image capture device, the noise standard deviation of the target segment based on the block SADs of the current sample blocks of the third block set in the luminance component and the noise average value.

12. The method for image noise estimation as claimed in claim 4, wherein the color space component is a chrominance component, and the step of establishing the noise model comprises:
respectively calculating, by the global noise estimation unit of the image capture device, a noise average value and a noise standard deviation of each of the segments in the chrominance component as the noise model.

13. The method for image noise estimation as claimed in claim 12, wherein the step of calculating the noise average value and the noise standard deviation comprises:
choosing, by the global noise estimation unit of the image capture device, one of the segments as a target segment;
choosing, by the global noise estimation unit of the image capture device, at least one of the current sample blocks in the target segment as a fourth block set of the target segment, wherein the block SADs of the current sample blocks of the fourth block set are smaller than or equal to a noise average value threshold; and
calculating, by the global noise estimation unit of the image capture device, the noise average value of the target segment based on the block SADs of the current sample blocks of the fourth block set in the chrominance component.

14. The method for image noise estimation as claimed in claim 13, wherein the step of calculating the noise average value and the noise standard deviation comprises:
choosing, by the global noise estimation unit of the image capture device, at least one of the current sample blocks in the target segment as a fifth block set of the target segment, wherein the block SADs of the current sample blocks of the fifth block set in the chrominance component are smaller than or equal to a noise standard deviation threshold; and
calculating, by the global noise estimation unit of the image capture device, the noise standard deviation of the target segment based on the block sum-of-absolute differences of the current sample blocks of the fifth block set in the chrominance component and the noise average value.

15. The method for image noise estimation as claimed in claim 1, wherein the step of calculating the noise level information of the local image block of the current image frame comprises:
calculating, by the local noise calculation unit of the image capture device, a luminance average value and an edge strength value of the local image block of the current image frame; and
calculating, by the local noise calculation unit of the image capture device, by the corresponding noise model, a noise average value, a noise standard deviation, and a noise reference value of the local image block in the color space component based on the luminance average value and the edge strength value of the local image block.

16. A device for image noise estimation, comprising:
a memory, storing a global noise estimation unit and a local noise calculation unit; and
a processor, loading the global noise estimation unit and the local noise calculation unit for the memory, and configured to:
determine a plurality of current sample blocks in a current image frame and a plurality of previous sample blocks in a previous image frame, calculate a block feature of each of the current sample blocks, calculate a block sum-of-absolute-difference (SAD) between each of the current sample blocks and a corresponding previous sample block of the previous sample blocks in at least one color space component, cluster the current sample blocks into a plurality of segments based on the block features, and respectively establish a noise model for each of the segments based on the block features and the block SADs; and calculate noise level information of a local image block of the current image frame based on a corresponding noise model of the noise models.

17. The device for image noise estimation as claimed in claim 16, wherein the processor is further configured to calculate a sample step value based on a sample number to determine sample positions of the current sample blocks and the previous sample blocks.

18. The device for image noise estimation as claimed in claim 16, wherein the processor is further configured to respectively calculate a luminance average value of a plurality of pixels of each of the current sample blocks as the block feature.

19. The device for image noise estimation as claimed in claim 18, wherein the processor is further configured to calculate a pixel edge strength value of each of the pixels in each of the current sample blocks and respectively calculate a block edge strength value of each of the current sample blocks based on the pixel edge strength values of the pixels.

20. The device for image noise estimation as claimed in claim 19, wherein, for a current pixel of the pixels, the processor is further configured to calculate a weighted average value of the current pixel and a plurality of adjacent pixels, calculate a first absolute difference between the current pixel and the weighted average value, respectively calculate a plurality of second absolute differences between the adjacent pixels and the weighted average value, and calculate a sum of the first absolute difference and the second absolute differences as the pixel edge strength value of the current pixel.

21. The device for image noise estimation as claimed in claim 19, wherein in a sample block of the current sample blocks, the processor is further configured to calculate a sum of the pixel edge strength values of the pixels as the block edge strength value of the sample block.

22. The device for image noise estimation as claimed in claim 19, wherein the processor is further configured to obtain a plurality of filtered current sample blocks by filtering the current sample blocks based on the luminance average value and the block edge strength value of each of the current sample blocks, wherein the luminance average values of the filtered current sample blocks are in a range of a predetermined minimum luminance average threshold to a predetermined maximum luminance average threshold, and the block edge strength values of the filtered current sample blocks are smaller than a predetermined edge strength value threshold, and the global noise estimation unit is further configured to cluster the filtered current sample blocks into the segments based on the luminance average values of the filtered current sample blocks.

23. The device for image noise estimation as claimed in claim 19, wherein the color space component is a luminance component, and the processor is further configured to respectively calculate a noise average value and a noise standard deviation of each of the segments in the luminance component as the noise model.

24. The device for image noise estimation as claimed in claim 23, wherein the processor is further configured to choose one of the segments as a target segment, and choose at least one of the current sample blocks in the target segment as a first block set of the target segment, wherein the block SADs of the current sample blocks of the first block set in the luminance component are smaller than or equal to a noise reference value threshold, and the global noise estimation unit is further configured to calculate an edge strength reference value of the target segment based on the block edge strength values of the current sample blocks in the first block set and calculate a noise reference value of the target segment based on the block SADs of the current sample blocks of the first block set in the luminance component.

25. The device for image noise estimation as claimed in claim 24, wherein the processor is further configured to choose at least one of the current sample blocks in the target segment as a second block set of the target segment, wherein the block SADs of the current sample blocks of the second block set in the luminance component are smaller than or equal to a noise average value threshold, and the global noise estimation unit is further configured to calculate a first coefficient value and a second coefficient value based on the edge strength reference value and the noise reference value and based on the block SADs and the block edge strength values of the current sample blocks of the second block set in the luminance component.

26. The device for image noise estimation as claimed in claim 25, wherein the processor is further configured to choose at least one of the current sample blocks in the target segment as a third block set of the target segment, wherein the block SADs of the current sample blocks of the third block set in the luminance component are smaller than or equal to a noise standard deviation threshold, the global noise estimation unit is further configured to calculate the noise average value of the target segment based on the first coefficient value and the second coefficient value and based on the edge strength values of the current sample blocks in the third block set, and the global noise estimation unit is further configured to calculate the noise standard deviation of the target segment based on the block SADs of the current sample blocks of the third block set in the luminance component and the noise average value.

27. The device for image noise estimation as claimed in claim 19, wherein the color space component is a chrominance component, and the processor is further configured to respectively calculate a noise average value and a noise standard deviation of each of the segments in the chrominance component as the noise model.

28. The device for image noise estimation as claimed in claim 27, wherein the processor is further configured to choose one of the segments as a target segment, and choose at least one of the current sample blocks in the target segment as a fourth block set of the target segment, wherein the block SADs of the current sample blocks of the fourth block set are smaller than or equal to a noise average value threshold, and the global noise estimation unit is further configured to calculate the noise average value of the target segment based on the block SADs of the current sample blocks of the fourth block set in the chrominance component.

29. The device for image noise estimation as claimed in claim 28, wherein the processor is further configured to choose at least one of the current sample blocks in the target segment as a fifth block set of the target segment, wherein the block SADs of the current sample blocks of the fifth block set in the chrominance component are smaller than or equal to a noise standard deviation threshold, and the global noise estimation unit is further configured to calculate the noise standard deviation of the target segment based on the block sum-of-absolute differences of the current sample blocks of the fifth block set in the chrominance component and the noise average value.

30. The device for image noise estimation as claimed in claim 16, wherein the processor is further configured to calculate a luminance average value and an edge strength value of the local image block, and calculate, by the corresponding noise model, a noise average value, a noise standard deviation, and a noise reference value of the local image block in the color space component based on the luminance average value and the edge strength value of the local image block.

31. An image capture apparatus, comprising:
an image capturer, configured to capture a current image frame;
a memory, configured to store the current image frame and a previous image frame;
a non-transitory medium, configured to store a program; and
a processor, connected to the non-transitory medium, the image capturer, and the memory and configured to access the memory and execute the program of the non-transitory medium, wherein the program comprises a global noise estimation unit and a local noise calculation unit, the global noise estimation unit is configured to determine a plurality of current sample blocks in the current image frame and a plurality of previous sample blocks of the previous image frame, calculate a block feature of each of the current sample blocks, calculate a block sum-of-absolute-difference (SAD) between each of the current sample blocks and a corresponding previous sample block of the previous sample blocks in at least one color space component, cluster the current sample blocks into a plurality of segments based on the block features, and respectively establish a noise model for each of the segments based on the block features and the block SADs, and the local noise calculation unit is configured to calculate noise level information of a local image block of the current image frame based on a corresponding noise model of the noise models.

32. The image capture apparatus as claimed in claim 31, wherein the global noise estimation unit is further configured to calculate a sample step value based on a sample number to determine sample positions of the current sample blocks and the previous sample blocks.

33. The image capture apparatus as claimed in claim 31, wherein the global noise estimation unit is further configured to respectively calculate a luminance average value of a plurality of pixels of each of the current sample blocks as the block feature.

34. The image capture apparatus as claimed in claim 33, wherein the global noise estimation unit is further configured to calculate a pixel edge strength value of each of the pixels in each of the current sample blocks and respectively calculate a block edge strength value of each of the current sample blocks based on the pixel edge strength values of the pixels.

35. The image capture apparatus as claimed in claim 34, wherein, for a current pixel of the pixels, the global noise estimation unit is further configured to calculate a weighted average value of the current pixel and a plurality of adjacent pixels, calculate a first absolute difference between the current pixel and the weighted average value, respectively calculate a plurality of second absolute differences between the adjacent pixels and the weighted average value, and calculate a sum of the first absolute difference and the second absolute differences as the pixel edge strength value of the current pixel.

36. The image capture apparatus as claimed in claim 34, wherein in a sample block of the current sample blocks, the global noise estimation unit is further configured to calculate a sum of the pixel edge strength values of the pixels as the block edge strength value of the sample block.

37. The image capture apparatus as claimed in claim 34, wherein the global noise estimation unit is further configured to obtain a plurality of filtered current sample blocks by filtering the current sample blocks based on the luminance average value and the block edge strength value of each of the current sample blocks, wherein the luminance average values of the filtered current sample blocks are in a range of a predetermined minimum luminance average threshold to a predetermined maximum luminance average threshold, and the block edge strength values of the filtered current sample blocks are smaller than a predetermined edge strength value threshold, and the global noise estimation unit is further configured to cluster the filtered current sample blocks into the segments based on the luminance average values of the filtered current sample blocks.

38. The image capture apparatus as claimed in claim 34, wherein the color space component is a luminance component, and the global noise estimation unit is further configured to respectively calculate a noise average value and a noise standard deviation of each of the segments in the luminance component as the noise model.

39. The image capture apparatus as claimed in claim 38, wherein the global noise estimation unit is further configured to choose one of the segments as a target segment, and choose at least one of the current sample blocks in the target segment as a first block set of the target segment, wherein the block SADs of the current sample blocks of the first block set in the luminance component are smaller than or equal to a noise reference value threshold, and the global noise estimation unit is further configured to calculate an edge strength reference value of the target segment based on the block edge strength values of the current sample blocks in the first block set and calculate a noise reference value of the target segment based on the block SADs of the current sample blocks of the first block set in the luminance component.

40. The image capture apparatus as claimed in claim 39, wherein the global noise estimation unit is further configured to choose at least one of the current sample blocks in the target segment as a second block set of the target segment, wherein the block SADs of the current sample blocks of the second block set in the luminance component are smaller than or equal to a noise average value threshold, and the global noise estimation unit is further configured to calculate a first coefficient value and a second coefficient value based on the edge strength reference value and the noise reference value and based on the block SADs and the block edge strength values of the current sample blocks of the second block set in the luminance component.

41. The image capture apparatus as claimed in claim 40, wherein the global noise estimation unit is further configured to choose at least one of the current sample blocks in the target segment as a third block set of the target segment, wherein the block SADs of the current sample blocks of the third block set in the luminance component are smaller than or equal to a noise standard deviation threshold, the global noise estimation unit is further configured to calculate the noise average value of the target segment based on the first coefficient value and the second coefficient value and based on the edge strength values of the current sample blocks in the third block set, and the global noise estimation unit is further configured to calculate the noise standard deviation of the target segment based on the block SADs of the current sample blocks of the third block set in the luminance component and the noise average value.

42. The image capture apparatus as claimed in claim 34, wherein the color space component is a chrominance component or an intensity component, and the global noise estimation unit is further configured to respectively calculate a noise average value and a noise standard deviation of each of the segments in the chrominance component or the intensity component as the noise model.

43. The image capture apparatus as claimed in claim 42, wherein the global noise estimation unit is further configured to choose one of the segments as a target segment, and choose at least one of the current sample blocks in the target segment as a fourth block set of the target segment, wherein the block SADs of the current sample blocks of the fourth block set are smaller than or equal to a noise average value threshold, and the global noise estimation unit is further configured to calculate the noise average value of the target segment based on the block SADs of the current sample blocks of the fourth block set in the chrominance component or the intensity component.

44. The image capture apparatus as claimed in claim 43, wherein the global noise estimation unit is further configured to choose at least one of the current sample blocks in the target segment as a fifth block set of the target segment, wherein the block SADs of the current sample blocks of the fifth block set in the chrominance component or the intensity component are smaller than or equal to a noise standard deviation threshold, and the global noise estimation unit is further configured to calculate the noise standard deviation of the target segment based on the block sum-of-absolute differences of the current sample blocks of the fifth block set in the chrominance component and the noise average value.

45. The image capture apparatus as claimed in claim 31, wherein the local noise calculation unit is further configured to calculate a luminance average value and an edge strength value of the local image block, and calculate, by the corresponding noise model, a noise average value and a noise standard deviation of the local image block in the color space component based on the luminance average value and the edge strength value of the local image block.

\* \* \* \* \*